(12) United States Patent
Kim et al.

(10) Patent No.: US 12,498,811 B2
(45) Date of Patent: Dec. 16, 2025

(54) SENSOR DRIVING CIRCUIT AND DISPLAY DEVICE INCLUDING THE SAME

(71) Applicant: Samsung Display Co., LTD., Yongin-si (KR)

(72) Inventors: Soo Won Kim, Yongin-si (KR); Hyun Jae Lee, Yongin-si (KR); Young Sik Kim, Yongin-si (KR); Tae Joon Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/662,416

(22) Filed: May 13, 2024

(65) Prior Publication Data

US 2025/0130657 A1   Apr. 24, 2025

(30) Foreign Application Priority Data

Oct. 19, 2023   (KR) ........................ 10-2023-0140741

(51) Int. Cl.
*G06F 3/041* (2006.01)
*G06F 1/16* (2006.01)
(Continued)

(52) U.S. Cl.
CPC .......... *G06F 3/0412* (2013.01); *G06F 1/1652* (2013.01); *G06F 3/044* (2013.01); *G06F 3/1446* (2013.01)

(58) Field of Classification Search
CPC ...... G06F 3/0412; G06F 1/1652; G06F 3/044; G06F 3/1446
See application file for complete search history.

(56) References Cited

U.S. PATENT DOCUMENTS 9,323,381 B2   4/2016  Lim et al.
10,496,205 B2  12/2019 Jung et al.
2016/0110149 A1* 4/2016 Sirpal .................. G06F 3/0482
                                                     345/1.3

FOREIGN PATENT DOCUMENTS

KR        101374018 B1    3/2014
KR      1020180077375 A   7/2018
(Continued)

*Primary Examiner* — Yaron Cohen
(74) *Attorney, Agent, or Firm* — CANTOR COLBURN LLP

(57) ABSTRACT

A display device includes: a first sensor driver connected to a first sensor unit including a first-analog-front end, a first analog-to-digital converter, and a digital signal processor; and a second sensor driver connected to a second sensor unit including a second-analog-front end, and a second analog-to-digital converter. In a first mode, the first-analog-front end and the first analog-to-digital converter generate first sensing information for the first sensor unit, the second sensor driver does not operate, and the digital signal processor processes the first sensing information based on a first setting value for the first sensor unit. In a second mode, the first-analog-front end and the first analog-to-digital converter do not operate, the second-analog-front end and the second analog-to-digital converter generate second sensing information for the second sensor unit, and the digital signal processor processes the second sensing information based on a second setting value for the second sensor unit.

14 Claims, 16 Drawing Sheets

(51) Int. Cl.
 G06F 3/044 (2006.01)
 G06F 3/14 (2006.01)

(56) References Cited

FOREIGN PATENT DOCUMENTS

KR 1020180079978 A 7/2018
WO 2018128303 A1 7/2018

* cited by examiner

FIG. 8

<Third mode>

| | P1 | P2 | P1 | P2 |
|---|---|---|---|---|
| Vsync1 | | | | |
| Vsync2 | | | | |
| AFE1, ADC1 | OFF | ON | OFF | ON |
| AFE3, ADC3 | ON | OFF | ON | OFF |
| MEM | CONFIG3 | CONFIG1 | CONFIG3 | CONFIG1 |
| DSP | ON | ON | ON | ON |
| TCV1, TCV3 | ON | OFF | ON | OFF |

SENSOR DRIVING CIRCUIT AND DISPLAY DEVICE INCLUDING THE SAME

This application claims priority to Korean Patent Application No. 10-2023-0140741, filed on Oct. 19, 2023, and all the benefits accruing therefrom under 35 U.S.C. § 119, the content of which in its entirety is herein incorporated by reference.

BACKGROUND

1. Field

The disclosure relates to a sensor driving circuit and a display device including the same.

2. Description of the Related Art

As information technology develops, importance of a display device, which is a connection medium between a user and information, has been highlighted. In response to this, a use of a display device such as a liquid crystal display device and an organic light emitting display device is increasing.

Demand for a display device including a plurality of display panels is increasing. When a plurality of integrated chips ("ICs") are provided for the plurality of display panels, a disadvantage in that cost and power consumption increase exists.

SUMMARY

A technical aspect is to provide a sensor driving circuit and a display device including the same capable of reducing cost and power consumption by simplifying a configuration of ICs.

According to an embodiment of the disclosure, a display device includes: a first display panel including a first sensor unit, a second display panel including a second sensor unit, a first sensor driver connected to the first sensor unit, and a second sensor driver connected to the second sensor unit. The first sensor driver includes a first analog front end, a first analog-to-digital converter, a memory, a digital signal processor, and a first transceiver, the second sensor driver includes a second analog front end, a second analog-to-digital converter, and a second transceiver, in a first mode, the first analog front end and the first analog-to-digital converter generate first sensing information for the first sensor unit, the second analog front end and the second analog-to-digital converter do not operate, and the digital signal processor processes the first sensing information based on a first setting value for the first sensor unit stored in the memory, and in the second mode, the first analog front end and the first analog-to-digital converter do not operate, the second analog front end and the second analog-to-digital converter generate second sensing information for the second sensor unit, and the digital signal processor processes the second sensing information based on a second setting value for the second sensor unit stored in the memory.

In the first mode, the first display panel may display an image frame, and the second display panel may stop display of the image frame, and in the second mode, the first display panel may stop display of the image frame, and the second display panel may display the image frames.

In the second mode, the second sensing information may be transmitted to the digital signal processor through the second transceiver and the first transceiver, and the digital signal processor may process the second sensing information during a period in which the first display panel does not display the image frame.

The digital signal processor may be a multi-core processor including a plurality of cores, and the number of cores used by the digital signal processor in the second mode may be less than the number of cores used by the digital signal processor in the first mode.

The display device may further include a third sensor driver connected to the first sensor unit, and a first switch unit electrically connecting the first sensor unit to one of the first sensor driver and the third sensor driver, and the third sensor driver includes a third analog front end, a third analog-to-digital converter, and a third transceiver.

In a third mode, the first display panel may display an image frame, and the second display panel does not display the image frame, a period in which the first display panel displays one image frame may include a first period and a second period, during the first period, the first switch unit may connect the first sensor unit to the third sensor driver, and during the second period, the first switch unit may connect the first sensor unit to the first sensor driver.

During the first period, the first analog front end and the first analog-to-digital converter may not operate, the third analog front end and the third analog-to-digital converter may generate third sensing information for the first sensor unit, and the digital signal processor may process the third sensing information based on a third setting value for the first sensor unit stored in the memory, and during the second period, the first analog front end and the first analog-to-digital converter may generate the first sensing information for the first sensor unit, the third analog front end and the third analog-to-digital converter may not operate, and the digital signal processor may process the first sensing information based on the first setting value for the first sensor unit stored in the memory.

The first sensor unit may include first sensors and second sensors forming a capacitance with the first sensors, during the first period, the third analog front end may apply uplink signals to the first sensors and the second sensors and receive a downlink signal through the first sensors and the second sensors, and during the second period, the first analog front end may apply driving signals to the first sensors and receive sensing signals through the second sensors.

The first analog front end may include a first driving signal generator for generating the driving signals, and first channels connected to the second sensors, and the first driving signal generator may be connected to the first sensors.

The third analog front end may include a second driving signal generator for generating the uplink signals, second channels, and a switch circuit electrically connecting the first sensors and the second sensors to the second driving signal generator or the second channels.

The display device may further include a fourth sensor driver connected to the second sensor unit, and a second switch unit electrically connecting the second sensor unit to one of the second sensor driver and the fourth sensor driver, and the fourth sensor driver may include a fourth analog front end, a fourth analog-to-digital converter, and a fourth transceiver.

In a fourth mode, the first display panel may stop display of the image frame, and the second display panel displays the image frame, a period in which the second display panel displays one image frame may include a third period and a fourth period, during the third period, the second switch unit may connect the second sensor unit to the fourth sensor driver, and during the fourth period, the second switch unit may connect the second sensor unit to the second sensor driver.

During the third period, the second analog front end and the second analog-to-digital converter may not operate, the fourth analog front end and the fourth analog-to-digital converter may generate fourth sensing information for the second sensor unit, and the digital signal processor may process the fourth sensing information based on a fourth setting value for the second sensor unit stored in the memory, and during the fourth period, the second analog front end and the second analog-to-digital converter may generate the second sensing information for the second sensor unit, the fourth analog front end and the fourth analog-to-digital converter may not operate, and the digital signal processor may process the second sensing information based on the second setting value for the second sensor unit stored in the memory.

According to an embodiment of the disclosure, a display device includes a first display panel including a first sensor unit, a second display panel including a second sensor unit, a first sensor driver connected to the first sensor unit, a (2-1)-th sensor driver connected to a portion of the second sensor units, and a (2-2)-th sensor driver connected to another portion of the second sensor unit. The first sensor driver includes a first analog front end, a first analog-to-digital converter, a memory, a digital signal processor, and a first transceiver, the (2-1)-th sensor driver includes a (2-1)-th analog front end, a (2-1)-th analog-to-digital converter, and a (2-1)-th transceiver, the (2-2)-th sensor driver includes a (2-2)-th analog front end, a (2-2)-th analog-to-digital converter, and a (2-2)-th transceiver, in the first mode, the first analog front end and the first analog-to-digital converter generate first sensing information for the first sensor unit, the (2-1)-th analog front end, the (2-1)-th analog-to-digital converter, the (2-2)-th analog front end, and the (2-2)-th analog-to-digital converter do not operate, and the digital signal processor processes the first sensing information based on a first setting value for the first sensor unit stored in the memory, and in the second mode, the first analog front end and the first analog-to-digital converter do not operate, the (2-1)-th analog front end, the (2-1)-th analog-to-digital converter, the (2-2)-th analog front end, and the (2-2)-th analog-to-digital converter generates second sensing information for the second sensor unit, and the digital signal processor processes the second sensing information based on a second setting value for the second sensor unit stored in the memory.

According to an embodiment of the disclosure, a sensor driving circuit mounted on a display device including a first sensor unit and a second sensor unit includes a first analog front end connected to the first sensor unit, a first analog-to-digital converter that converts an output signal of the first analog front end into a digital signal, a memory storing a first setting value for the first sensor unit and a second setting value for the second sensor unit, a digital signal processor that processes sensing information based on the first setting value or the second setting value, and a first transceiver capable of communicating with an auxiliary sensor driving circuit. In the first mode, the first analog front end and the first analog-to-digital converter generate first sensing information for the first sensor unit, the first transceiver does not operate, and the digital signal processor processes the first sensing information based on the first setting value, and in the second mode, the first analog front end and the first analog-to-digital converter do not operate, the first transceiver receives second sensing information for the second sensor unit from the auxiliary sensor driving circuit, and the digital signal processor processes the second sensing information based on the second setting value.

The display device may further include a first display unit overlapping the first sensor unit and a second display unit overlapping the second sensor unit, in the first mode, the first display unit may display an image frame, and the second display unit does not display the image frame, and in the second mode, the first display unit may stop display of the image frame, and the second display unit may display the image frames.

In the second mode, the digital signal processor may process the second sensing information during a period in which the first display unit does not display the image frame.

The digital signal processor may be a multi-core processor including a plurality of cores, and the number of cores used by the digital signal processor in the second mode may be less than the number of cores used by the digital signal processor in the first mode.

The first sensor unit may include first sensors and second sensors forming a capacitance with the first sensors, the first analog front end may include a first driving signal generator for generating the driving signals, and first channels connected to the second sensors, and the first driving signal generator may be connected to the first sensors.

The second sensor unit may include third sensors and fourth sensors forming a capacitance with the third sensors, the auxiliary sensor driving circuit may include a second driving signal generator for generating uplink signals, second channels, and a switch circuit electrically connecting the third sensors and the fourth sensors to the second driving signal generator or the second channels.

A sensor driving circuit and a display device including the same according to the disclosure may reduce cost and power consumption by simplifying a configuration of ICs.

BRIEF DESCRIPTION OF THE DRAWINGS

The above and other features of the disclosure will become more apparent by describing in further detail embodiments thereof with reference to the accompanying drawings, in which:

FIG. 8 is a diagram illustrating operations in a third mode according to an embodiment of the disclosure;

DETAILED DESCRIPTION

Figure 1:
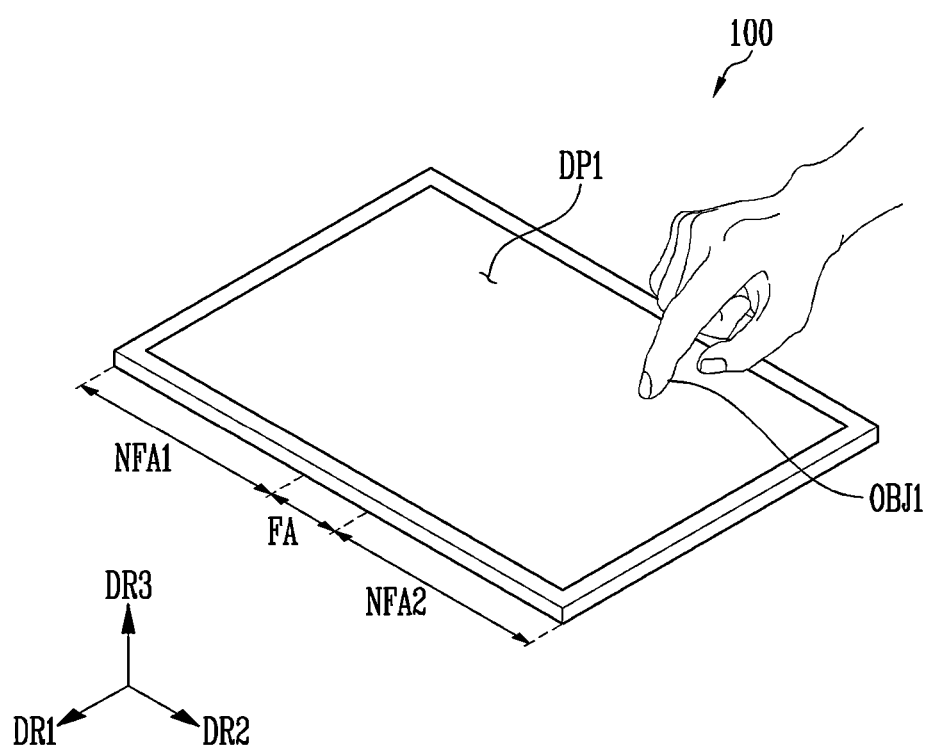
FIGS. 1 and 2 are diagrams illustrating a display device according to an embodiment of the disclosure.

Hereinafter, various embodiments of the disclosure will be described in detail with reference to the accompanying drawings so that those skilled in the art may easily carry out the disclosure. The disclosure may be implemented in various different forms and is not limited to the embodiments described herein.

In order to clearly describe the disclosure, parts that are not related to the description are omitted, and the same or similar elements are denoted by the same reference numerals throughout the specification. Therefore, the above-described reference numerals may be used in other drawings.

In addition, sizes and thicknesses of each component shown in the drawings are arbitrarily shown for convenience of description, and thus the disclosure is not necessarily limited to those shown in the drawings. In the drawings, thicknesses may be exaggerated to clearly express various layers and areas.

In addition, an expression "is the same" in the description may mean "is substantially the same". That is, the expression "is the same" may be the same enough for those of ordinary skill to understand that it is the same. Other expressions may also be expressions in which "substantially" is omitted.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

It will be understood that when an element is referred to as being "on" another element or "connected to" another element, it can be directly on or directly connected to the other element or intervening elements may be present therebetween. In contrast, when an element is referred to as being "directly on" another element, there are no intervening elements present.

Figure 2:
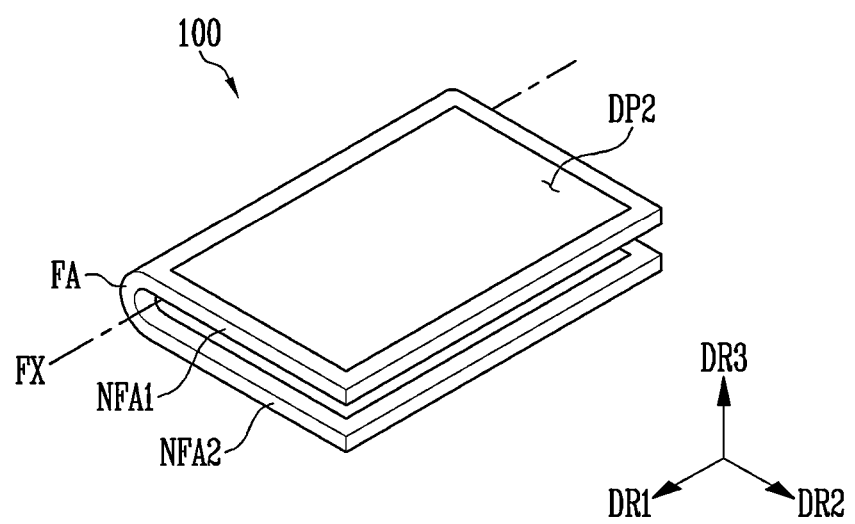

FIGS. 1 and 2 are diagrams illustrating a display device according to an embodiment of the disclosure.

The display device 100 according to an embodiment of the disclosure may include a plurality of display panels DP1 and DP2. The display device 100 may be a foldable display device. Referring to FIG. 1, the display device 100 of an unfolded state is shown. Referring to FIG. 2, the display device 100 of a folded state is shown. However, embodiments of the disclosure are not necessarily applied only to a foldable display device. Embodiments of the disclosure may be applied to any type of display device including a plurality of display panels. In addition, even though one display panel is included, embodiments of the disclosure may be applied to a case where a plurality of ICs are used for a plurality of division areas.

When the display device 100 is unfolded as shown in FIG. 1, the first display panel DP1 may be exposed. In a flat state, the first display panel DP1 may have a plane defined by a first direction DR1 and a second direction DR2 and may display an image in a third direction DR3. The first direction DR1, the second direction DR2, and the third direction DR3 may be perpendicular to each other.

The first display panel DP1 may display an image in an unfolded state. In addition, the first display panel DP1 may sense a user's touch input in the unfolded state. At this time, a body portion such as a user's finger may be referred to as a first object OBJ1.

The display device 100 may include a first unfoldable area NFA1, a foldable area FA, and a second unfoldable area NFA2 sequentially positioned along the second direction DR2. For example, the foldable area FA may be disposed between the first unfoldable area NFA1 and the second unfoldable area NFA2. In FIGS. 1 and 2, one foldable area FA and two unfoldable areas NFA1 and NFA2 are shown, but embodiments are not limited thereto. For example, the display device 100 may include more than two unfoldable areas and foldable areas disposed between the unfoldable areas.

The display device 100 may be folded based on a folding axis FX. The foldable area FA may be bent based on the folding axis FX. In embodiments, the folding axis FX may be defined as a minor axis parallel to a short side of the display device 100. For example, the folding axis FX may extend along the first direction DR1.

The display device 100 may be folded inwardly with respect to the folding axis FX. When the display device 100 is folded, a display surface of the first unfoldable area NFA1 and a display surface of the second unfoldable area NFA2 may face each other.

Referring to FIG. 2, the second display panel DP2 may be positioned on an opposite surface of the first unfoldable area NFA1. For example, the display device 100 of the folded state may stop display and sensing of the first display panel DP1 and start display and sensing of the second display panel DP2. On the other hand, when the display device 100 is unfolded again as shown in FIG. 1, the display device 100 may stop display and sensing of the second display panel DP2 and start display and sensing of the first display panel DP1.

Figure 3:
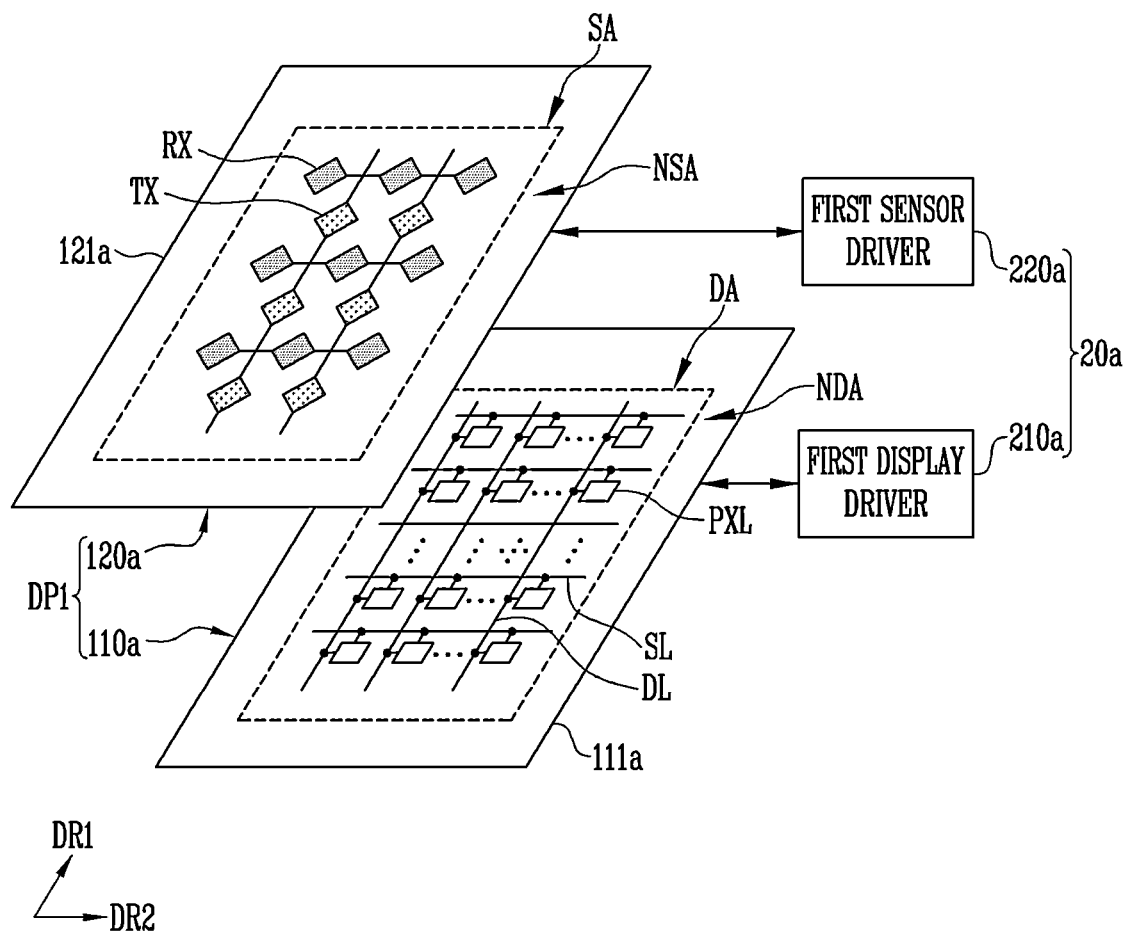
FIGS. 3 and 4 are diagrams illustrating display panels according to an embodiment of the disclosure.
Figure 4:
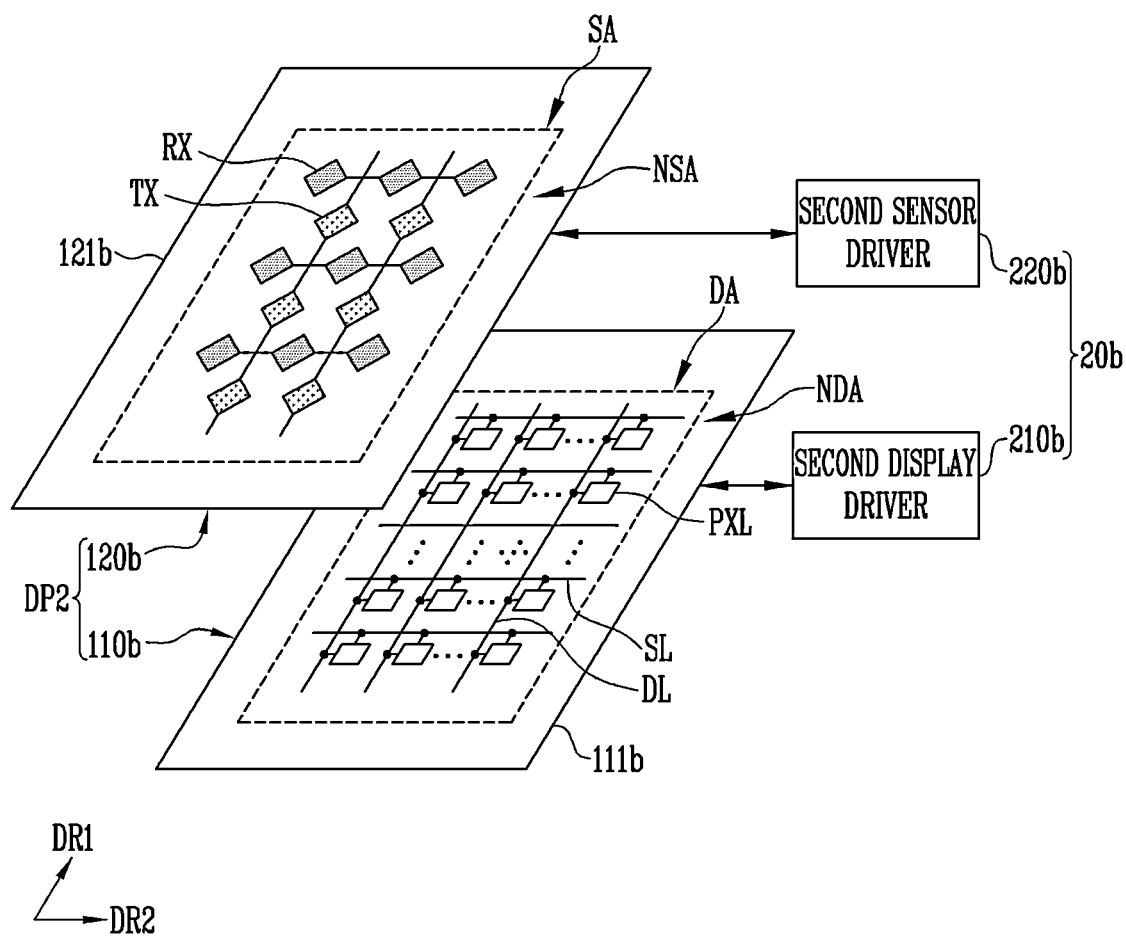

FIGS. 3 and 4 are diagrams illustrating display panels according to an embodiment of the disclosure.

Referring to FIG. 3, the display device 100 may include the first display panel DP1 and a first driving circuit unit 20a for driving the first display panel DP1.

For example, the first display panel DP1 may include a first display unit 110a for displaying an image and a first sensor unit 120a for sensing touch, pressure, fingerprint, hovering, active pen, and the like. The first sensor unit 120a may be positioned to overlap the first display unit 110a in a plan view. For example, the first display panel DP1 may include pixels PXL and first sensors TX and second sensors RX which are positioned to overlap at least a portion of the pixels PXL. The first sensors TX and the second sensors RX may form a mutual capacitance. The driving circuit unit 20 may include a first display driver 210a for driving the first display unit 110a and a first sensor driver 220a for driving the first sensor unit 120a.

According to an embodiment, the first display unit 110a and the first sensor unit 120a may be manufactured separately from each other and then disposed and/or combined so that at least one area overlaps each other. Alternatively, in another embodiment, the first display unit 110a and the first sensor unit 120a may be manufactured integrally. For example, the first sensor unit 120a may be may be formed directly on at least one substrate configuring the first display unit 110a (for example, an upper and/or lower substrate of the display panel, or a thin film encapsulation layer), or another insulating layer or various functional layers (for example, an optical layer or a protective layer).

Meanwhile, in FIG. 3, the first sensor unit 120a is disposed on a side of a front surface (for example, an upper surface where the image is displayed) of the first display unit 110a, but a position of the first sensor unit 120a is not limited thereto. For example, in another embodiment, the first sensor unit 120a may be disposed on a rear surface or both surfaces of the first display unit 110a. In still another embodiment, the first sensor unit 120a may be disposed in at least one edge area of the first display unit 110a.

The first display unit 110a may include a first display substrate 111a and a plurality of pixels PXL formed on the first display substrate 111a. The pixels PXL may be disposed in a display area DA of the first display substrate 111a.

The first display substrate 111a may include the display area DA where the image is displayed and a non-display area NDA outside the display area DA. According to an embodiment, the display area DA may be disposed in a central area of the first display unit 110a, and the non-display area NDA may be disposed in an edge area of the first display unit 110a to surround the display area DA.

The first display substrate 111a may be a rigid substrate or a flexible substrate, and a material or a physical property thereof is not particularly limited. For example, the first display substrate 111a may be a rigid substrate formed of glass or tempered glass, or a flexible substrate formed of a thin film of a plastic or metal material.

Scan lines SL and data lines DL, and pixels PXL connected to the scan lines SL and the data lines DL are disposed in the display area DA. The pixels PXL may be selected by a turn-on level of scan signal supplied from the scan lines SL, may receive a data voltage from the data lines DL, and may emit light of a luminance corresponding to the data voltage. Accordingly, an image corresponding to the data voltage is displayed in the display area DA. In the disclosure, a structure, a driving method, and the like of the pixels PXL are not particularly limited. For example, each of the pixels PXL may be implemented as a pixel of various currently known structures and/or driving methods.

Various lines and/or a built-in circuit unit connected to the pixels PXL of the display area DA may be disposed in the non-display area NDA. For example, a number of lines for supplying various power and control signals to the display area DA may be disposed in the non-display area NDA, and in addition, a scan driver or the like may be further disposed in the non-display area NDA.

In the disclosure, a type of the first display unit 110a is not particularly limited. For example, the first display unit 110a may be implemented as a self-emission type of display panel, such as an organic light emitting display panel. Alternatively, the first display unit 110a may be implemented as a non-emission type of display panel, such as a liquid crystal display panel. When the first display unit 110a is implemented as a non-emission type, the display device may additionally include a light source such as a back-light unit.

The first sensor unit 120a includes a first sensor substrate 121a and a plurality of sensors TX and RX disposed on the first sensor substrate 121a. The sensors TX and RX may be disposed in the sensing area SA on the first sensor substrate 121a.

The first sensor substrate 121a may include a sensing area SA capable of sensing a touch input and the like, and a peripheral area NSA outside the sensing area SA. According to an embodiment, the sensing area SA may be disposed to overlap at least one area of the display area DA. For example, the sensing area SA may be set to an area corresponding to the display area DA (for example, an area overlapping the display area DA), and the peripheral area NSA may be set to an area corresponding to the non-display area NDA (for example, an area overlapping the non-display area NDA). In this case, when a touch input or the like is provided on the display area DA, the touch input may be detected through the first sensor unit 120a.

The first sensor substrate 121a may be a rigid or flexible substrate, and may also be configured of at least one layer of an insulating layer. In addition, the first sensor substrate 121a may be a transparent or translucent light-transmissive substrate, but is not limited thereto. That is, in the disclosure, a material and a physical property of the first sensor substrate 121a are not particularly limited. For example, the first sensor substrate 121a may be a rigid substrate formed of glass or tempered glass, or a flexible substrate formed of a thin film of a plastic or metal material. In addition, according to an embodiment, at least one substrate configuring the first display unit 110a (for example, the first display substrate 111a, an encapsulation substrate, and/or a thin film encapsulation layer), or at least one layer of insulating layer, functional layer, or the like disposed in an inside or on an outer surface of the first display unit 110a may be used as the first sensor substrate 121a.

The sensing area SA is set as an area that may respond to a user input (that is, an active area of a sensor). To this end, the sensors TX and RX for sensing the user input or the like may be disposed in the sensing area SA. According to an embodiment, the sensors TX and RX may include the first sensors TX and the second sensors RX. The first sensors TX and the second sensors RX may cross each other.

For example, each of the first sensors TX may extend in the first direction DR1. The first sensors TX may be arranged in the second direction DR2. The second direction DR2 may be different from the first direction DR1. For example, the second direction DR2 may be a direction orthogonal to the first direction DR1. In another embodiment, an extension direction and an arrangement direction of the first sensors TX may follow another conventional configuration. Each of the first sensors TX may have a shape in which first cells of a relatively large area and first bridges of a relatively small area are connected. In FIG. 3, each of the first cells are shown in a diamond shape, but may be configured in various conventional shapes such as a circular shape, a quadrangular shape, a triangular shape, or a mesh form. For example, the first bridges may be formed integrally with the first cells on the same layer. In another embodiment, the first bridges may be formed on a layer different from that of the first cells to electrically connect adjacent first cells.

For example, each of the second sensor RX may extend in the second direction DR2. The second sensors RX may be arranged in the first direction DR1. In another embodiment, an extension direction and an arrangement direction of the second sensors RX may follow another conventional configuration. Each of the second sensors RX may have a shape in which second cells with a relatively large area and second bridges with a relatively small area are connected. In FIG. 3, each second cell is shown in a diamond shape, but may be configured in various conventional shapes such as a circular shape, a quadrangular shape, a triangular shape, or a mesh form. For example, the second bridges may be formed integrally with the second cells on the same layer. In another embodiment, the second bridges may be formed on a layer different from that of the second cells to electrically connect adjacent second cells.

According to an embodiment, each of the first sensors TX and the second sensors RX may have conductivity by including at least one of a metal material, a transparent conductive material, and various other conductive materials. For example, the first sensors TX and the second sensors RX may include at least one of various metal materials including gold (Au), silver (Ag), aluminum (Al), molybdenum (Mo), chromium (Cr), titanium (Ti), nickel (Ni), neodymium (Nd), copper (Cu), and platinum (Pt), or an alloy thereof. At this time, the first sensors TX and the second sensors RX may be configured in a mesh form. In addition, the first sensors TX and the second sensors RX may include at least one of various transparent conductive materials including silver nanowire (AgNW), indium tin oxide ("ITO"), indium zinc oxide ("IZO"), indium gallium zinc oxide ("IGZO"), antimony zinc oxide ("AZO"), indium tin zinc oxide ("ITZO"), zinc oxide (ZnO), tin oxide (SnO$_2$), carbon nano tube, graphene, and the like. In addition, the first sensors TX and the second sensors RX may have conductivity by including at least one of various conductive materials. In addition, each of the first sensors TX and the second sensors RX may be formed of a single layer or multiple layers, and a cross-sectional structure thereof is not particularly limited.

Meanwhile, sensor lines for electrically connecting the sensors TX and RX to the first sensor driver 220a and the like may be intensively disposed in the peripheral area NSA of the first sensor unit 120a.

The first driving circuit unit 20a may include the first display driver 210a for driving the first display unit 110a and the first sensor driver 220a for driving the first sensor unit 120a. In an embodiment, the first display driver 210a and the first sensor driver 220a may be configured of separate integrated chips (ICs). In another embodiment, at least a portion of the first display driver 210a and the first sensor driver 220a may be integrated together in one IC.

The first display driver 210a is electrically connected to the first display unit 110a and drives the pixels PXL. For example, the first display driver 210a may include a data driver and a timing controller, and the scan driver may be separately mounted in the non-display area NDA of the first display unit 110a. In another embodiment, the first display driver 210a may include all or at least a portion of the data driver, the timing controller, and the scan driver.

The first sensor driver 220a is electrically connected to the first sensor unit 120a and drives the first sensor unit 120a. The first sensor driver 220a is described later with reference to FIG. 5.

Referring to FIG. 4, the display device 100 may include the second display panel DP2 and a second driving circuit unit 20b for driving the second display panel DP2.

For example, the second display panel DP2 may include a second display unit 110b for displaying an image and a second sensor unit 120b for sensing touch, pressure, fingerprint, hovering, active pen, and the like. The second sensor unit 120b may be positioned to overlap the second display unit 110b. For example, the second display panel DP2 may include pixels PXL and third sensors TX and fourth sensors RX positioned to overlap at least a portion of the pixels PXL. The third sensors TX and the fourth sensors RX may form a mutual capacitance. The second driving circuit unit 20b may include a second display driver 210b for driving the second display unit 110b and a second sensor driver 220b for driving the second sensor unit 120b.

Hereinafter, a description of common parts of the second display panel DP2 and the first display panel DP1 is omitted. The second sensor driver 220b is described later with reference to FIG. 5.

Figure 5:
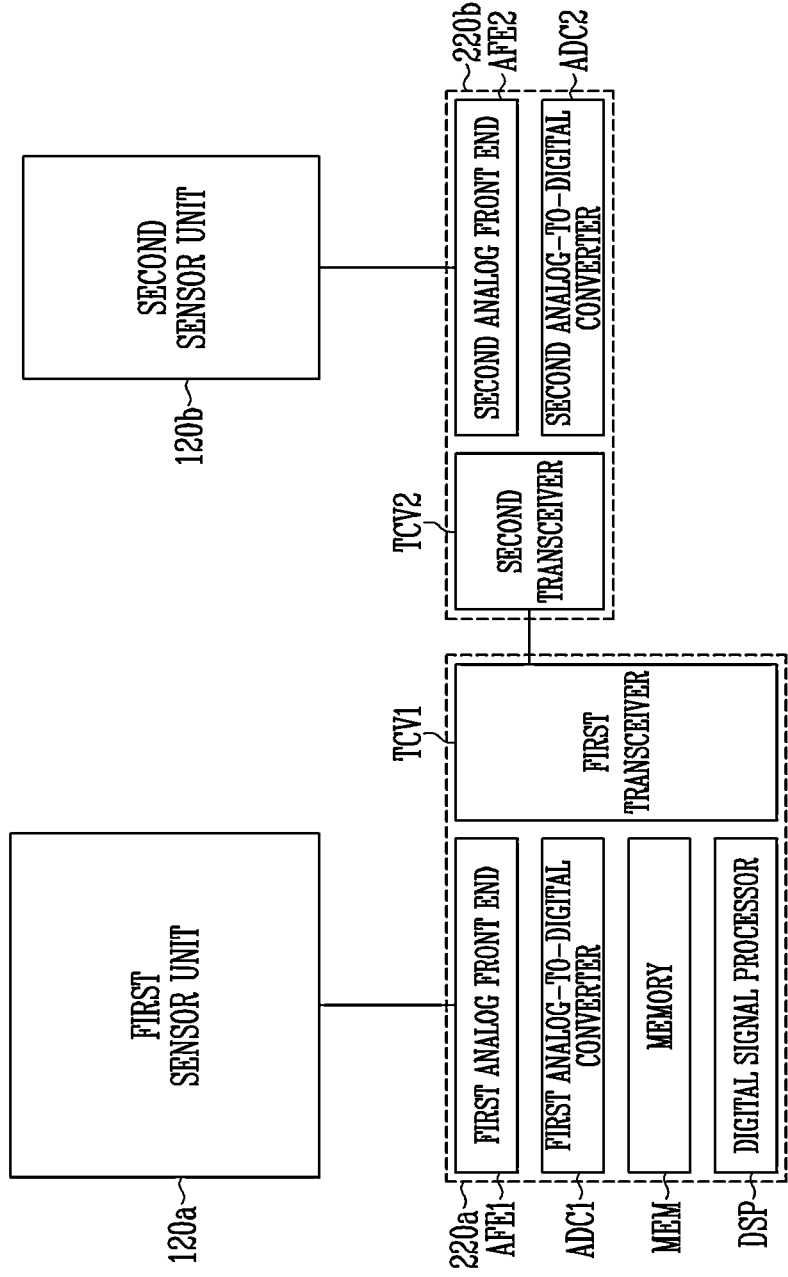
FIG. 5 is a diagram illustrating a first sensor driver and a second sensor driver according to an embodiment of the disclosure.

FIG. 5 is a diagram illustrating a first sensor driver and a second sensor driver according to an embodiment of the disclosure.

Referring to FIG. 5, the first sensor driver 220a according to an embodiment of the disclosure may include a first analog front end AFE1, a first analog-to-digital converter ADC1, and a first transceiver TCV1. The first sensor driver 220a may be connected to the first sensor unit 120a.

The first analog front end AFE1 may be connected to the first sensor unit 120a. The first analog front end AFE1 may generate analog sensing information for a first object OBJ1 by applying driving signals to the first sensors TX of the first sensor unit 120a and receiving sensing signals from the second sensors RX of the first sensor unit 120a. For example, the first object OBJ1 may be a user's body portion such as a finger.

The first analog-to-digital converter ADC1 may generate first sensing information by converting the analog sensing information received from the first analog front end AFE1 into a digital signal. For example, the "first sensing information" may be voltage information for each of sensing nodes which are intersection points of the first sensors TX and the second sensors RX of the first sensor unit 120a.

Meanwhile, the second sensor driver 220b according to an embodiment of the disclosure may include a second analog front end AFE2, a second analog-to-digital converter ADC2, and a second transceiver TCV2. The second sensor driver 220b may be connected to the second sensor unit 120b.

The second analog front end AFE2 may be connected to the second sensor unit 120b. The second analog front end AFE2 may generate the analog sensing information for the first object OBJ1 by applying the driving signals to the third sensors TX of the second sensor unit 120b and receiving sensing signals from the fourth sensors RX of the second sensor unit 120b.

The second analog-to-digital converter ADC2 may generate second sensing information by converting the analog sensing information received from the second analog front end AFE2 into a digital signal. For example, the "second sensing information" may be voltage information for each of sensing nodes which are intersection points of the third sensors TX and the fourth sensors RX of the second sensor unit 120b.

Meanwhile, the first sensor driver 220a according to an embodiment of the disclosure may further include a memory MEM and a digital signal processor DSP. On the other hand, the second sensor driver 220b does not include a memory MEM and a digital signal processor DSP, thereby reducing a configuration cost and power consumption.

The memory MEM may store a first setting value for the first sensor unit 120a and a second setting value for the second sensor unit 120b. Referring to FIGS. 1 and 2, physical configurations of the first sensor unit 120a included in the first display panel DP1 and the second sensor unit 120b included in the second display panel DP2 may be different from each other. For example, the number of sensing nodes which are the intersection points of the first sensors TX and the second sensors RX in the first sensor unit 120a may be greater than the number of sensing nodes which are the intersection points of the third sensors TX and the fourth sensors RX in the second sensor unit 120b. In addition, according to a position and the number of sensors, a load value (for example, an RC value) of the first sensor unit 120a and a load value of the second sensor unit 120b may be different from each other. When the load values are different from each other, signal waveforms according to the RC delay may become different from each other. In addition, noise that the first sensor unit 120a receives from the first display unit 110a and noise that the second sensor unit 120b receives from the second display unit 110b may be different from each other. In addition, various characteristics, such as a minimum distance at which user's two fingers may be distinguished, may be different in the first sensor unit 120a and the second sensor unit 120b.

The differences of the first sensor unit 120a and the second sensor unit 120b may be a reason of generation of different first sensing information and the second sensing information even for the same input of the first object OBJ1. For example, the first sensing information and the second sensing information may include different voltage values with respect to touch of the first object OBJ1 for the same position. Therefore, storing tuning values reflecting these differences is required to be stored in the memory MEM as the first setting value for the first sensor unit 120a and the second setting value for the second sensor unit 120b.

The digital signal processor DSP may process the first sensing information based on the first setting value. For example, the digital signal processor DSP may determine a position of the first object OBJ1 in the first sensor unit 120a based on the first sensing information. At this time, an operation of the first transceiver TCV1 and the second transceiver TCV2 may be unnecessary.

Meanwhile, the digital signal processor DSP may process the second sensing information based on the second setting value. For example, the digital signal processor DSP may determine the position of the first object OBJ1 in the second sensor unit 120b based on the second sensing information. At this time, the operation of the first transceiver TCV1 and the second transceiver TCV2 may be necessary. Since the memory MEM and the digital signal processor DSP do not included in the second sensor driver 220b, the second sensing information is required to be transmitted to the digital signal processor DSP included in the first sensor driver 220a through the second transceiver TCV2 and the first transceiver TCV1.

Figure 6:
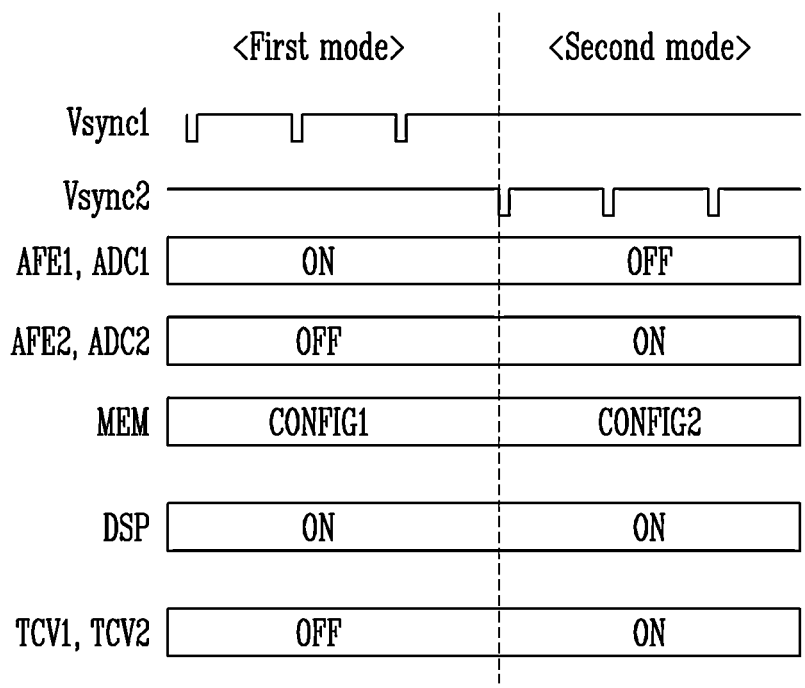
FIG. 6 is a diagram illustrating operations in a first mode and a second mode according to an embodiment of the disclosure.

FIG. 6 is a diagram illustrating operations in a first mode and a second mode according to an embodiment of the disclosure.

The first mode may be a mode in which the first display panel DP1 displays an image frame and the second display panel DP2 does not display the image frame. For example, in a state in which the display device 100 is unfolded as shown in FIG. 1, the first display unit 110a of the first display panel DP1 may display an image, and the second display unit 110b of the second display panel DP2 may not display an image.

In the first mode, the first sensor driver 220a may receive a first vertical synchronization signal Vsync1 from the first display driver 210a or the processor. The first vertical synchronization signal Vsync1 may include a plurality of pulses, and may indicate that a previous image frame period is ended and a current image frame period is started based on a time point when each of the pulses is generated. An interval between adjacent pulses of the first vertical synchronization signal may correspond to one frame period.

The processor may control software and hardware of the display device 100. For example, the processor may include at least one of a central processing unit ("CPU"), an application processor ("AP"), a graphics processing unit ("GPU"), a communication processor ("CP"), an image signal processor ("ISP"), and a neural processing unit ("NPU"). The processor may control the display drivers 210a and 210b and the sensor drivers 220a and 220b by providing an instruction, a timing signal, data, and the like.

Meanwhile, in the first mode, the second sensor driver 220b may not receive a second vertical synchronization signal Vsync2 from the second display driver 210b or the processor. For example, in the first mode, the second vertical synchronization signal Vsync2 may maintain a ground level or a specific DC voltage level.

The second mode may be a mode in which the first display panel DP1 does not display the image frame and the second display panel DP2 displays the image frames. For example, in a state in which the display device 100 is folded as shown in FIG. 2, the first display unit 110a of the first display panel DP1 may not display an image, and the second display unit 110b of the second display panel DP2 may display an image.

In the second mode, the second sensor driver 220b may receive the second vertical synchronization signal Vsync2 from the second display driver 210b or the processor. The second vertical synchronization signal Vsync2 may include a plurality of pulses, and may indicate that the previous image frame period is ended and the current image frame period is started based on the time point when each of the pulses is generated. An interval between adjacent pulses of the second vertical synchronization signal may correspond to one frame period.

Meanwhile, in the second mode, the first sensor driver 220a may not receive the first vertical synchronization signal Vsync1 from the first display driver 210a or the processor. For example, in the second mode, the first vertical synchronization signal Vsync1 may maintain the ground level or a specific DC voltage level.

Therefore, the first sensor driver 220a and the second sensor driver 220b may check whether a current mode is the first mode or the second mode through the first vertical synchronization signal Vsync1 and the second vertical synchronization signal Vsync2.

In the first mode, the first analog front end AFE1 and the first analog-to-digital converter ADC1 may generate the first sensing information for the first sensor unit 120a. The second analog front end AFE2 and the second analog-to-digital converter ADC2 may do not operate. The digital signal processor DSP may process the first sensing information based on the first setting value CONFIG. 1 for the first sensor unit 120a stored in the memory MEM. An output value of the digital signal processor DSP may include a position, pressure, a proximity degree, and the like of the first object OBJ1 for the first sensor unit 120a. At this time, an operation of the first transceiver TCV1 and the second transceiver TCV2 may be stopped. Hereinafter, a component operating in each mode is indicated as ON in the drawing, and a component of which an operation is stopped is indicated as OFF in the drawing.

In the second mode, the first analog front end AFE1 and the first analog-to-digital converter ADC1 may do not operate. The second analog front end AFE2 and the second analog-to-digital converter ADC2 may generate the second sensing information for the second sensor unit 120b. The digital signal processor DSP may process the second sensing information based on the second setting value CONFIG. 2 for the second sensor unit 120b stored in the memory MEM. An output value of the digital signal processor DSP may include a position, pressure, a proximity degree, and the like of the first object OBJ1 for the second sensor unit 120b.

In the second mode, the second sensing information may be transmitted to the digital signal processor DSP through the second transceiver TCV2 and the first transceiver TCV1. During a period in which the first display panel DP1 does not display the image frame, the digital signal processor DSP may process the second sensing information. That is, the digital signal processor DSP may operate also in the second mode in which the first display panel DP1 does not display and sense. Referring to FIGS. 1 and 2, since a case where both of the first display panel DP1 and the second display panel DP2 are used does not exist, even though the first display panel DP1 and the second display panel DP2 share and use the digital signal processor DSP, a problem such as performance deterioration does not exist. That is, rather than using the digital signal processor DSP in time division, the digital signal processor DSP may be used exclusively for each sensor unit 120a or 120b in each mode.

In an embodiment, the digital signal processor DSP may be a multi-core processor including a plurality of cores. At this time, the number of cores used by the digital signal processor DSP in the second mode may be less than the number of cores used by the digital signal processor DSP in the first mode. For example, since the number of sensing nodes of the second sensor unit 120b may be less than the number of sensing nodes of the first sensor unit 120a, an operation amount for the second sensing information may be less than an operation amount for the first sensing information. In this case, power consumption of the digital signal processor DSP may be reduced in the second mode.

Figure 7:
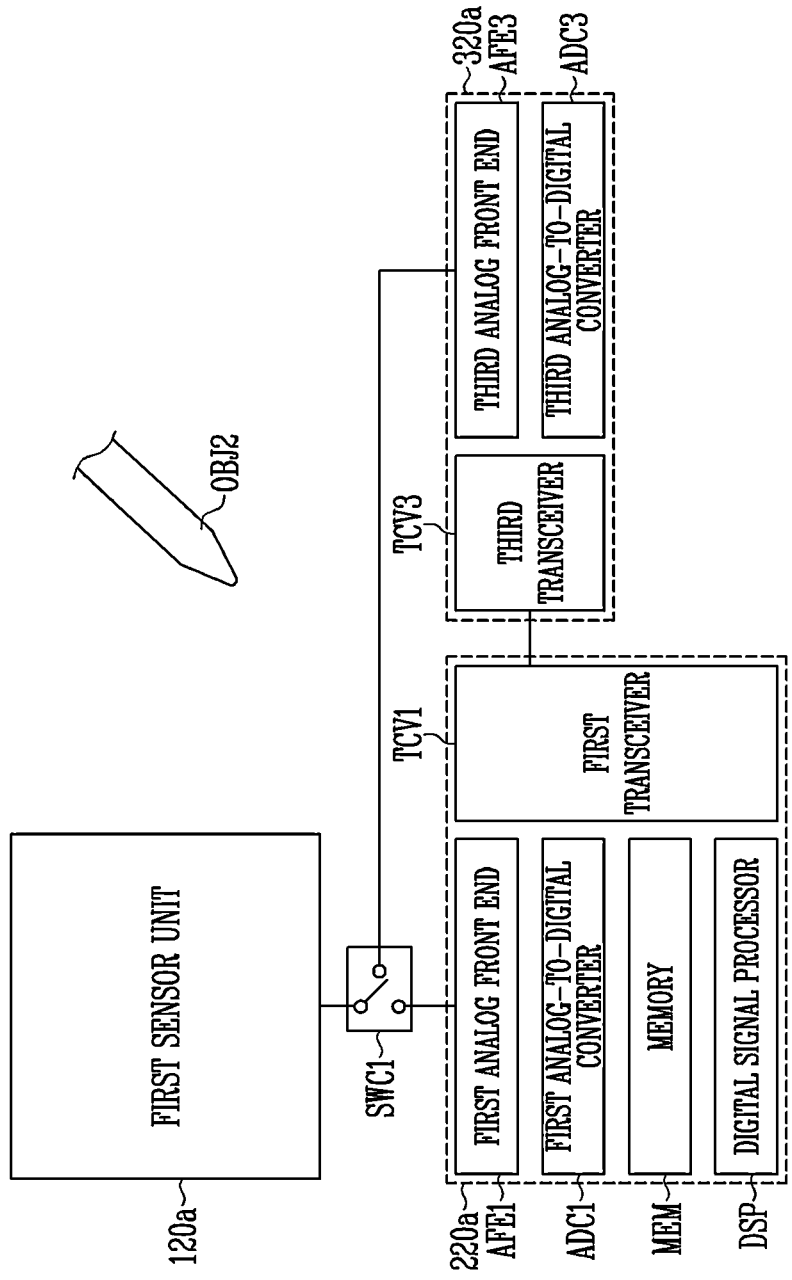
FIG. 7 is a diagram illustrating a third sensor driver according to an embodiment of the disclosure.

FIG. 7 is a diagram illustrating a third sensor driver according to an embodiment of the disclosure.

Referring to FIG. 7, the third sensor driver 320a according to an embodiment of the disclosure may include a third analog front end AFE3, a third analog-to-digital converter ADC3, and a third transceiver TCV3. The third sensor driver 320a may be connected to the first sensor unit 120a.

The third analog front end AFE3 may be connected to the first sensor unit 120a. The third analog front end AFE3 may generate analog sensing information for a second object OBJ2 by applying uplink signals to the first sensors TX and the second sensors RX of the first sensor unit 120a and receiving a downlink signal through the first sensors TX and the second sensors RX. For example, the second object OBJ2 may be an electronic device such as an active pen.

The third analog-to-digital converter ADC3 may generate third sensing information by converting the analog sensing information received from the third analog front end AFE3 into a digital signal. The "third sensing information" may be voltage information for each of the sensing nodes which are intersection points of the first sensors TX and the second sensors RX of the first sensor unit 120a.

The display device 100 may further include a first switch unit SWC1 that electrically connects the first sensor unit 120a to one of the first sensor driver 220a and the third sensor driver 320a.

FIG. 8 is a diagram illustrating operations in a third mode according to an embodiment of the disclosure.

In the third mode, the first display panel DP1 may display an image frame, and the second display panel DP2 may stop display of the image frame. Referring to FIG. 8, it may be seen that the first vertical synchronization signal Vsync1 including pulses is transmitted and the second vertical synchronization signal Vsync2 maintains a specific voltage level during the third mode. The third sensor driver 320a may confirm that a mode is the third mode by receiving the first vertical synchronization signal Vsync1.

One frame period of the first display panel DP1 may include a first period P1 and a second period P2. During the first period P1, the first switch unit SWC1 may connect the first sensor unit 120a to the third sensor driver 320a. During the second period P2, the first switch unit SWC1 may connect the first sensor unit 120a to the first sensor driver 220a. In FIG. 8, the first period P1 is positioned before the second period P2, but in another embodiment, the second period P2 may be positioned before the first period P1.

During the first period P1, the first analog front end AFE1 and the first analog-to-digital converter ADC1 may not operate, and the third analog front end AFE3 and the third analog-to-digital converter ADC3 may generate third sensing information for the first sensor unit 120a. The digital signal processor DSP may process the third sensing information based on a third setting value CONFIG. 3 for the first sensor unit 120a stored in the memory MEM. Since the first setting value CONFIG. 1 for the first sensor unit 120a is for the first object OBJ1 and the third setting value CONFIG. 3 for the first sensor unit 120a is for the second object OBJ2, the first setting value CONFIG. 1 and the third setting value CONFIG. 3 may be different from each other. For example, the number of sensing nodes used for detecting the second object OBJ2 may be greater than the number of sensing nodes used for detecting the first object OBJ1. An output value of the digital signal processor DSP may include a position, pressure, and an inclination of the second object OBJ2 for the first sensor unit 120a, an instruction using the second object OBJ2 by a user, and the like.

During the second period P2, the first analog front end AFE1 and the first analog-to-digital converter ADC1 may generate the first sensing information for the first sensor unit 120a, and the third analog front end AFE3 and the third analog-to-digital converter ADC3 may not operate. The digital signal processor DSP may process the first sensing information based on the first setting value CONFIG. 1 for the first sensor unit 120a stored in the memory MEM. The output value of the digital signal processor DSP may include the position, pressure, and proximity degree of the first object OBJ1 for the first sensor unit 120a.

During the first period P1, the third sensing information may be transmitted to the digital signal processor DSP through the third transceiver TCV3 and the first transceiver TCV1. In order to sense the first object OBJ1 and the second object OBJ2 through the common first sensor unit 120a, the first period P1 and the second period P2 is required to be distinguished. This is because a signal processing method for the first object OBJ1 and a signal processing method for the second object OBJ2 are different from each other. That is, since a case where the first object OBJ1 and the second object OBJ2 are sensed simultaneously does not exist, even though the first sensor driver 220a and the third sensor driver 320a share and use the digital signal processor DSP, a problem such as performance deterioration does not exist. Therefore, rather than using the digital signal processor DSP in time division, in the third mode, the digital signal processor DSP may be used exclusively for each period P1 or P2.

Figure 9:
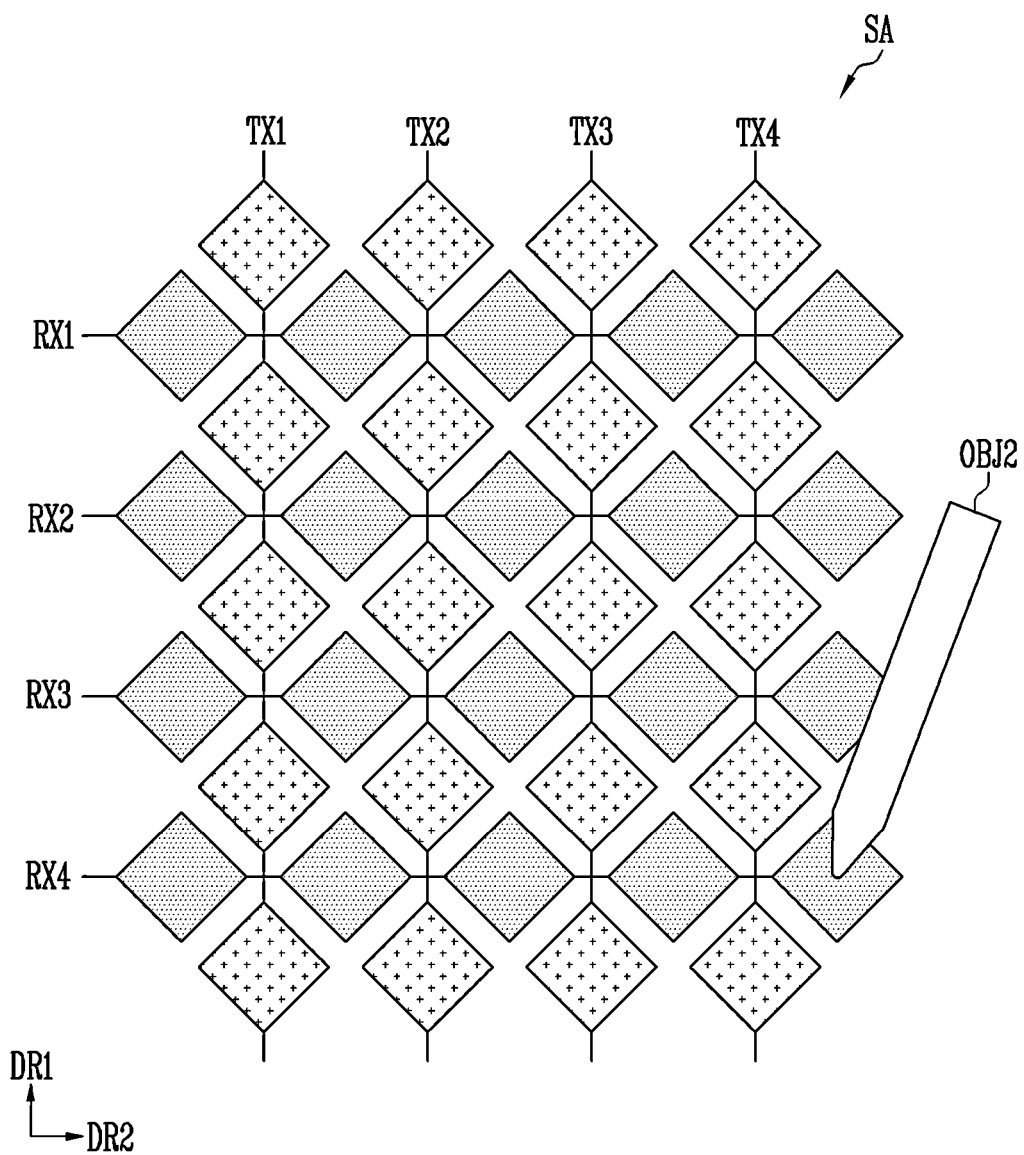
FIG. 9 is a diagram illustrating a sensing area of a sensor unit according to an embodiment of the disclosure.

FIG. 9 is a diagram illustrating a sensing area of a sensor unit according to an embodiment of the disclosure.

Referring to FIG. 9, first sensors TX1, TX2, TX3, and TX4 and second sensors RX1, RX2, RX3, and RX4 positioned in the sensing area SA of the first sensor unit 120a are exemplarily shown. For convenience of description, it is assumed that four first sensors TX1 to TX4 and four second sensors RX1 to RX4 are disposed in the sensing area SA. Since a configuration of the second sensor unit 120b is similar to that of the first sensor unit 120a, an overlapping description is omitted. Since a description of the first sensors TX1 to TX4 and the second sensors RX1 to RX4 is the same as a description of the first sensors TX and the second sensors RX of FIG. 3, an overlapping description is omitted.

The second object OBJ2 may be an active device that transmits and receives an electromagnetic signal to and from the first sensor unit 120a. For example, the second object OBJ2 may be an active pen. In an embodiment, the display device 100 may include the second object OBJ2 detachably. In another embodiment, the display device 100 and the second object OBJ2 may be separate products.

For example, sensitivity of a transmitted and received signal of the second object OBJ2 may be different according to a capacitance formed by a tip and the sensors TX and RX. In FIG. 9, it is assumed that the second sensor RX4 is closest to a tip of the second object OBJ2 and thus forms the largest capacitance. At this time, reception sensitivity of the second object OBJ2 may be relatively high with respect to an uplink signal transmitted from the second sensor RX4.

Figure 10:
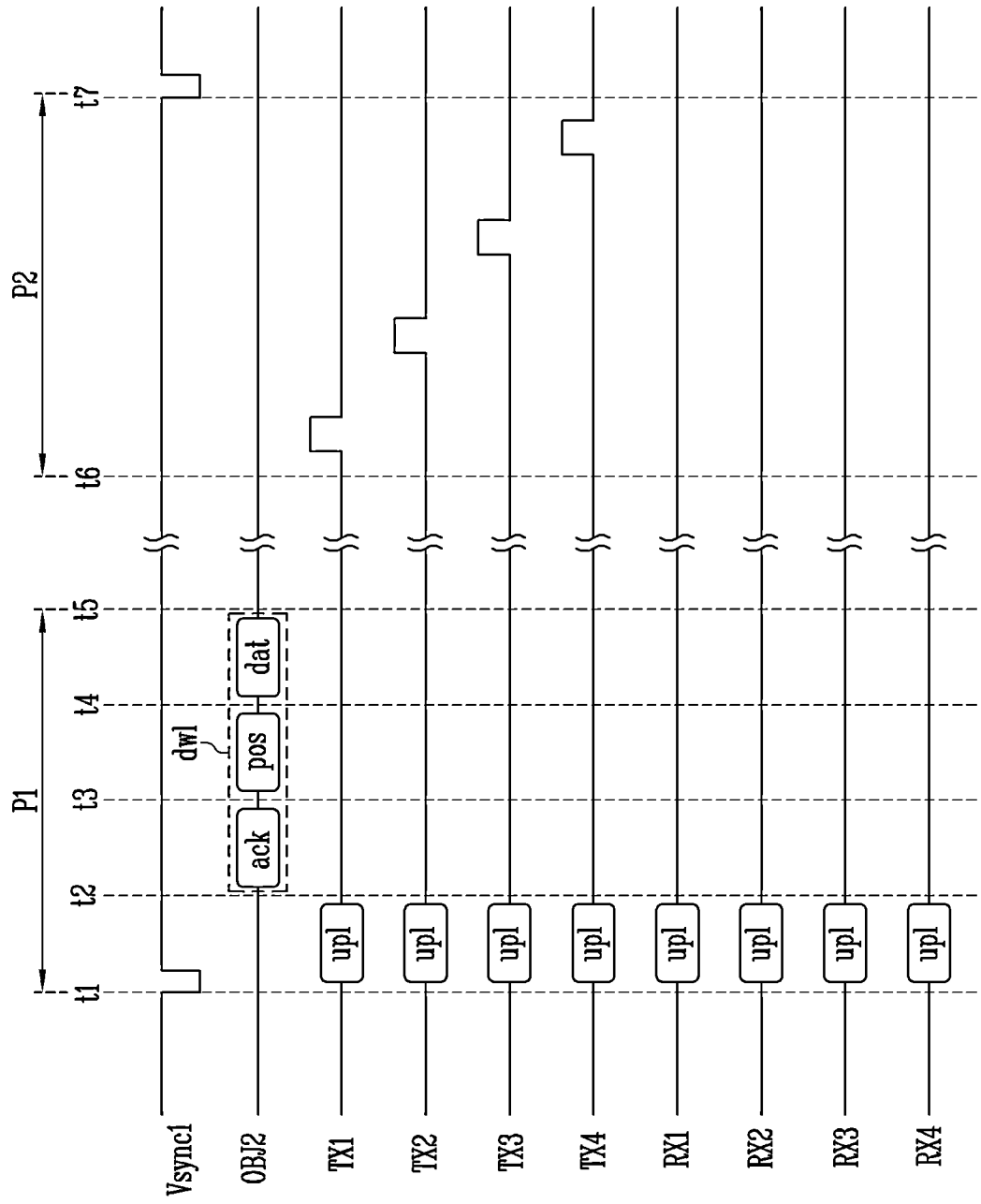
FIG. 10 is a diagram illustrating operations in a first period and a second period according to an embodiment of the disclosure.

FIG. 10 is a diagram illustrating operations in a first period and a second period according to an embodiment of the disclosure.

In FIG. 10, only portions necessary for a description are shown among signals of the first vertical synchronization signal Vysnc1, the second object OBJ2, and the sensors TX1 to TX4 and RX1 to RX4, and other portions are not shown. That is, in portions of a signal drawn as a straight line in FIG. 10, a variation of a voltage level may not exist, or a variation of a voltage level may exist due to noise or a received signal.

Referring to FIG. 10, one frame period t1 to t7 corresponding to one cycle of the first vertical synchronization signal Vsync1 is exemplarily shown. Here, a frame period refers to an image display unit (that is, a display frame period) of the first display unit 110a.

For example, one frame period t1 to t7 may include a first period P1 for sensing the second object OBJ2 and a second period P2 for sensing the first object OBJ1. Since signals for an image display of the first display unit 110a are generated throughout one frame period t1 to t7, the signals may overlap the first period P1 and the second period P2.

First, during a period t1 to t2, the first sensors TX1, TX2, TX3, and TX4 and the second sensors RX1, RX2, RX3, and RX4 may transmit uplink signals upl. For example, the first sensors TX1 to TX4 and the second sensors RX1 to RX4 may simultaneously transmit the uplink signals upl. Accordingly, a case where the second object OBJ2 positioned on the first sensor unit 120a does not receive the uplink signal upl does not occur.

In some cases, the uplink signal upl may interfere with a data voltage for displaying the image of the first display unit 110a. Accordingly, an inappropriate data voltage may be stored in a corresponding pixel, and display quality deterioration may occur. As shown in FIG. 10, when all sensors TX1 to TX4 and RX1 to RX4 transmit the uplink signals upl simultaneously during the period t1 to t2, the interference due to the uplink signals upl may be maximum.

According to an embodiment, in order to reduce channel configuration cost and power consumption, during the period t1 to t2 of each frame period, only the first sensors TX1 to TX4 may transmit the uplink signals upl or only the second sensors RX1 to RX4 may transmit the uplink signals upl. In this case, the interference due to the uplink signal upl may be reduced, but a dead zone in which the uplink signal upl may not be received according to a position of the first object OBJ1 on the sensor unit 120 may occur.

When the second object OBJ2 receives the uplink signal upl, the second object OBJ2 may transmit a downlink signal dwl. The downlink signal dwl may be variously configured according to a protocol. For example, in a universal stylus initiative ("USI") protocol, the downlink signal dwl may include an acknowledgment signal ack, a position signal pos, and a data signal dat. As another example, in the active electrostatic solution ("AES") protocol, the downlink signal dwl may include the position signal pos and the data signal dat. In addition, the downlink signal dwl may be defined by various known protocols.

The second object OBJ2 may transmit the acknowledgment signal ack during a period t2 to t3. The acknowledgement signal ack may be a signal for notifying that the second object OBJ2 is positioned near the first sensor unit 120a.

In addition, the second object OBJ2 may sequentially transmit the position signal pos and the data signal dat. For example, the second object OBJ2 may transmit the position signal pos during a period t3 to t4 and transmit the data signal dat during a period t4 to t5. The position signal pos may be a signal for specifying a position of the second object OBJ2 on the first sensor unit 120a. For example, the position signal pos may have a signal intensity stronger than that of the acknowledgment signal ack or may include pulses more than that of the acknowledgment signal ack. The data signal dat may be a signal including information (for example, button press, pressure, and the like) except for the position of the second object OBJ2.

Each of the period t1 to t2 for transmitting the uplink signal upl, the period t2 to t3 for transmitting the acknowledgment signal ack, the period t3 to t4 for transmitting the position signal pos, and the period t4 to t5 for transmitting the data signal dat may configure a time slot. The time slot may be a time unit defined for communication between the second object OBJ2 and the first sensor unit 120a.

During the second period P2, the first analog front end AFE1 may sequentially apply the driving signals to the first sensors TX1 to TX4. For example, the sensing signals may be supplied to the first sensor TX1 twice (rising transition and falling transition), the sensing signals may be supplied to the first sensor TX2 twice, the sensing signals may be supplied to the first sensor TX3 twice, and the sensing signals may be supplied to the first sensor TX4 twice. The number of times the sensing signals are supplied to each of the first sensors TX1 to TX4 may be more than twice according to an embodiment.

For example, in correspondence with the rising transition applied to the first sensor TX1, channels connected to the second sensors RX1 to RX4 may receive the sensing signals independently of each other. In addition, in correspondence with the falling transition applied to the first sensor TX1, channels connected to the second sensors RX1 to RX4 may receive the sensing signals independently of each other.

In the sensing area SA, according to the position of the first object OBJ1, a mutual capacitance between the first sensors TX1 to TX4 and the second sensors RX1 to RX4 may be different from each other (refer to FIG. 11), and thus the sensing signals received by the channels may also be different from each other.

Figure 11:
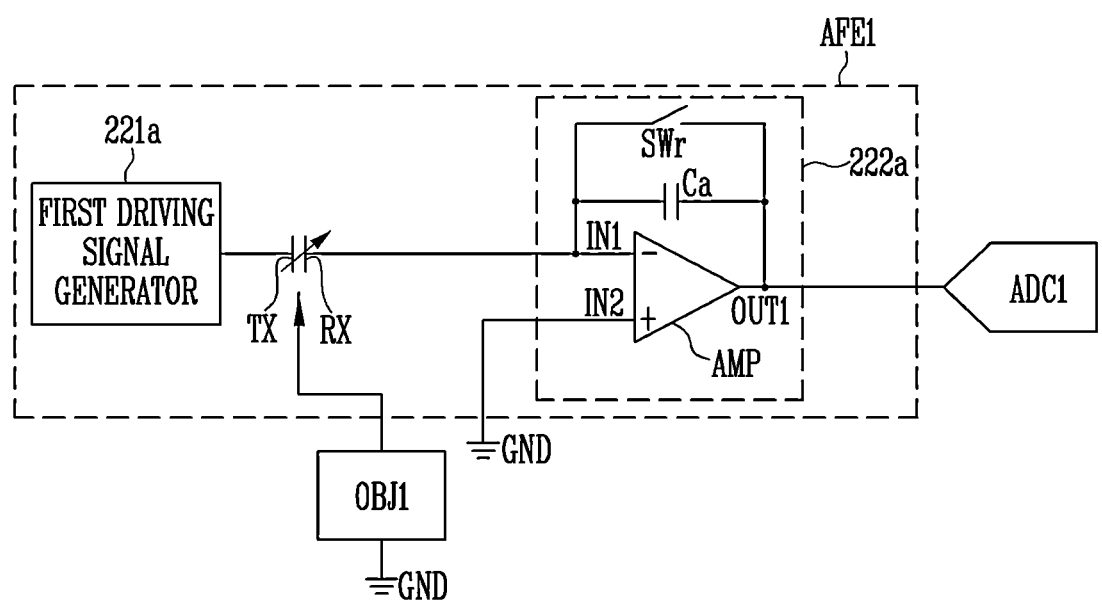
FIG. 11 is a diagram illustrating a first analog front end according to an embodiment of the disclosure.

FIG. 11 is a diagram illustrating a first analog front end according to an embodiment of the disclosure.

Referring to FIG. 11, the first analog front end AFE1 according to an embodiment of the disclosure may include a first driving signal generator 221a and first channels 222a. The first channels 222a may exist independently with respect to each of the second sensors RX. For example, the number of second sensors RX and the number of first channels 222a may be the same, and the second sensors RX and the first channels 222a may be connected one to one. In FIG. 11, only one first channel 222a is shown for convenience of description.

The first driving signal generator 221a may be connected to the first sensors TX. The first driving signal generator 221a may sequentially apply the driving signals to the first sensors TX1 to TX4 during the second period P2.

An operational amplifier AMP may have a first input terminal IN1 connected to the corresponding second sensor RX, and a second input terminal IN2 connected to reference power GND. For example, the first input terminal IN1 may be an inverting terminal, and the second input terminal IN2 may be a non-inverting terminal. The reference power GND may be a ground voltage or a voltage of a specific magnitude.

According to an embodiment, the first channel 222a may be implemented as an integrator. In this case, a capacitor Ca and a switch SWr may be connected in parallel between the first input terminal IN1 and an output terminal OUT1 of the operational amplifier AMP. For example, charges of the capacitor Ca may be initialized by turning on the switch SWr before starting sensing. During a sensing period, the switch SWr may be in a turn-off state.

The first channel 222a may generate an output signal corresponding to a voltage difference between the first and second input terminals IN1 and IN2. For example, the first channel 222a may amplify a difference voltage between the first and second input terminals IN1 and IN2 to a level corresponding to a predetermined gain and output.

Figure 12:
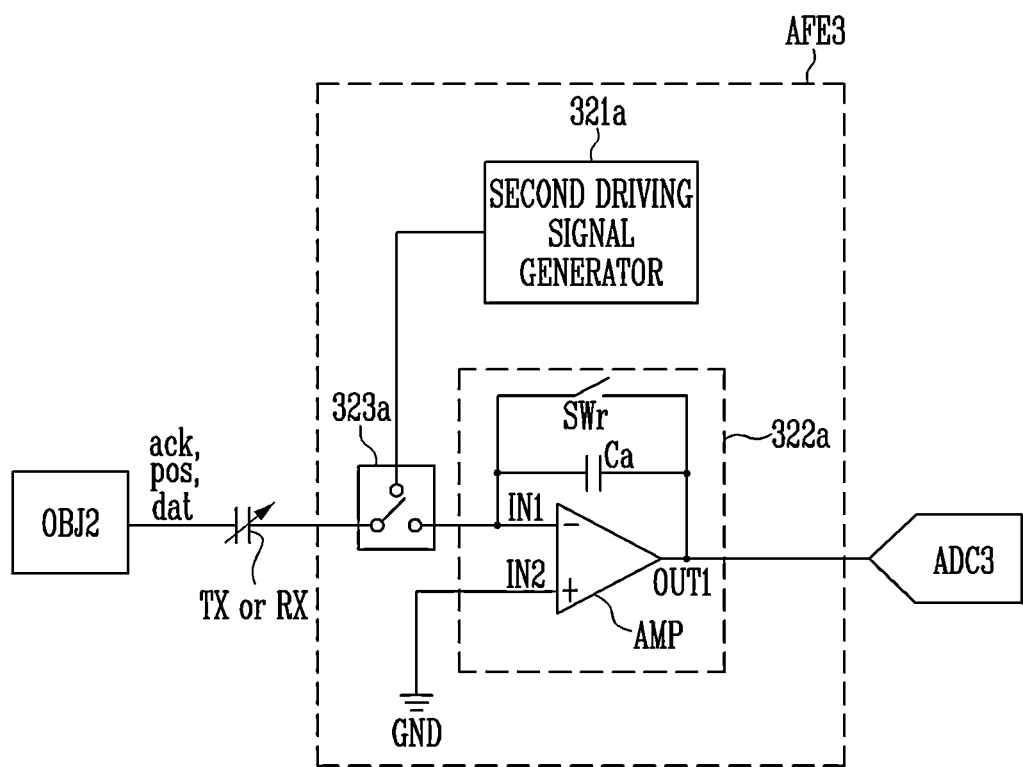
FIG. 12 is a diagram illustrating a third analog front end according to an embodiment of the disclosure.

FIG. 12 is a diagram illustrating a third analog front end according to an embodiment of the disclosure.

Referring to FIG. 12, the third analog front end AFE3 according to an embodiment of the disclosure may include a second driving signal generator 321a, second channels 322a, and a switch circuit 323a. The number of second channels 322a may be the same as the number of first sensors TX and second sensors RX. However, in a case of sensing in a time division, the number of second channels 322a may be less than the number of first sensors TX and second sensors RX. In FIG. 12, only one second channel 322a is shown for convenience of description.

The second driving signal generator 321a may generate the uplink signals upl.

Since a configuration of the second channel 322a is the same as that of the first channel 222a, an overlapping description is omitted.

The switch circuit 323a may electrically connect the first sensors TX and the second sensors RX to the second driving signal generator 321a or the second channels 322a. For example, during the period t1 to t2, the switch circuit 323a may connect the first sensors TX and the second sensors RX to the second driving signal generator 321a. Meanwhile, during the period t2 to t5, the switch circuit 323a may connect the first sensors TX and the second sensors RX to the second channels 322a.

During the period t2 to t3, at least a portion of the sensors TX and RX may receive the acknowledgment signal ack for the uplink signal upl. In an embodiment, in order to reduce channel configuration cost and power consumption, only the first sensors TX may be connected to the second channels 322a to receive the acknowledgment signal ACK. In another embodiment, in order to reduce channel configuration cost and power consumption, only the second sensors RX may be connected to the second channels 322a to receive the acknowledgment signal ACK. In still another embodiment, at least a portion of the first sensors TX and at least a portion of the second sensors RX may be connected to the second channels 322a to receive the acknowledgment signal ack.

During the period t3 to t4, at least a portion of the sensors TX and RX may receive the position signal pos. For example, at least a portion of the first sensors TX and at least a portion of the second sensors RX may receive the position signal pos. Referring to FIG. 9, the position of the second object OBJ2 in the second direction DR2 may be detected using the second channels 322a connected to the first sensors TX1 to TX4. In addition, the position of the second object OBJ2 in the first direction DR1 may be detected using the second channels 322a connected to the second sensors RX1 to RX4. In an embodiment, when the number of second channels 322a is sufficient, the position in the first direction DR1 and the position in the second direction DR2 of the second object OBJ2 may be detected simultaneously. In another embodiment, when the number of second channels 322a is insufficient, the position in the first direction DR1 and the position in the second direction DR2 of the second object OBJ2 may be detected during different periods.

During the period t4 to t5, at least a portion of the sensors TX and RX may receive the data signal dat for the uplink signal upl. In an embodiment, in order to reduce channel configuration cost and power consumption, only the first sensors TX may be connected to the second channels 322a to receive the data signal dat. In another embodiment, in order to reduce channel configuration cost and power consumption, only the second sensors RX may be connected to the second channels 322a to receive the data signal dat. In still another embodiment, at least a portion of the first sensors TX and at least a portion of the second sensors RX may be connected to the second channels 322a to receive the data signal dat.

The content described above with reference to FIGS. 8 to 12 may be similarly applied not only to the third mode but also to a fourth mode which will be described later with reference to FIGS. 13 and 14.

Figure 13:
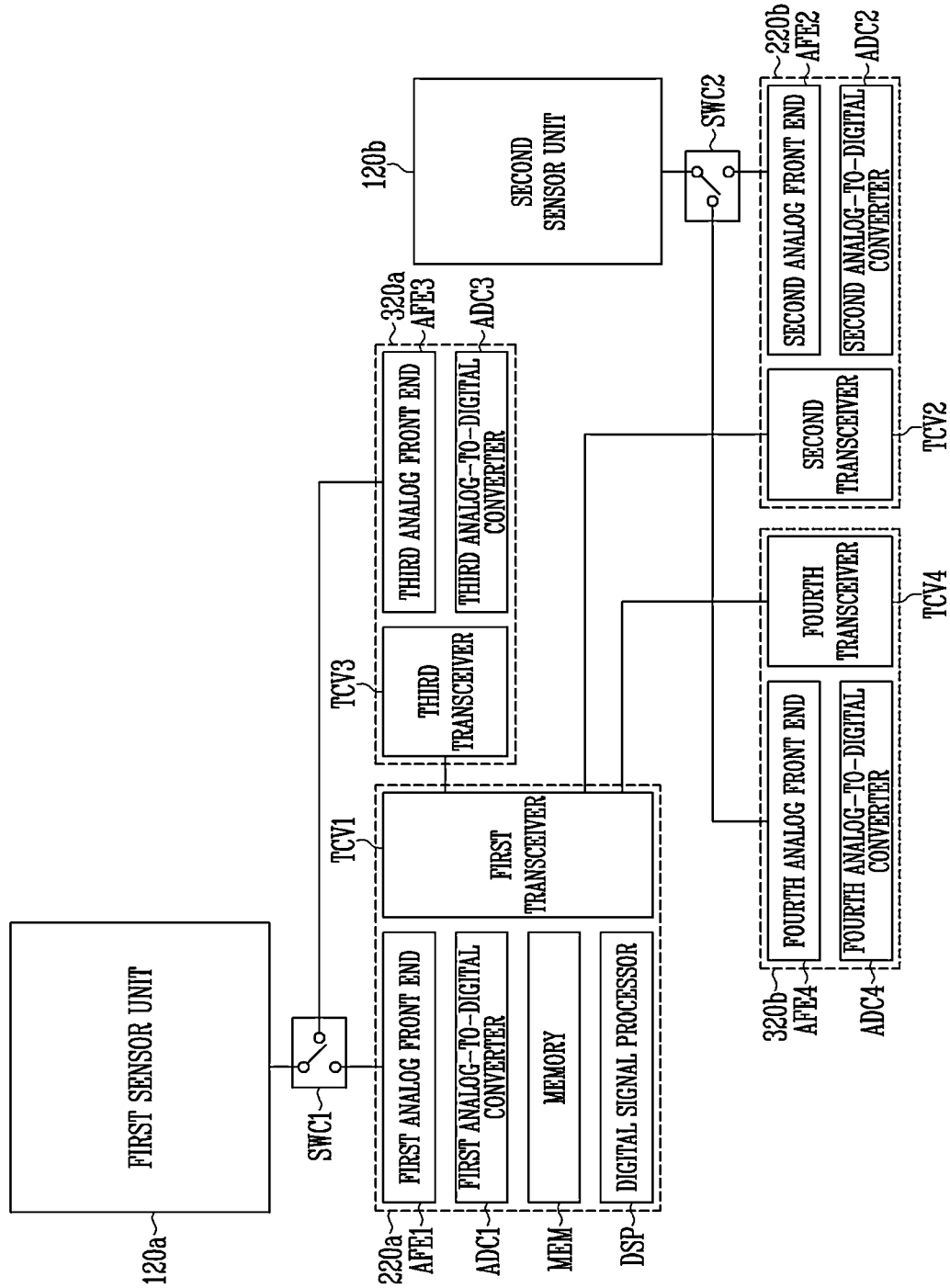
FIG. 13 is a diagram illustrating a fourth sensor driver according to an embodiment of the disclosure.

FIG. 13 is a diagram illustrating a fourth sensor driver according to an embodiment of the disclosure.

Referring to FIG. 13, the fourth sensor driver 320b according to an embodiment of the disclosure may include a fourth analog front end AFE4, a fourth analog-to-digital converter ADC4, and a fourth transceiver TCV4. The fourth sensor driver 320b may be connected to the second sensor unit 120b.

The fourth analog front end AFE4 may be connected to the second sensor unit 120b. The fourth analog front end AFE4 may generate analog sensing information for the second object OBJ2 by applying the uplink signals to the third sensors TX and the fourth sensors RX of the second sensor unit 120b and receiving the downlink signal through the third sensors TX and the fourth sensors RX. For example, the second object OBJ2 may be an electronic device such as an active pen.

The fourth analog-to-digital converter ADC4 may generate fourth sensing information by converting the analog sensing information received from the fourth analog front end AFE4 into a digital signal. The "fourth sensing information" may be voltage information for each of the sensing nodes which are intersection points of the third sensors TX and the fourth sensors RX of the second sensor unit 120b.

The display device 100 may further include a second switch unit SWC2 that electrically connects the second sensor unit 120b to one of the second sensor driver 220b and the fourth sensor driver 320b.

Figure 14:
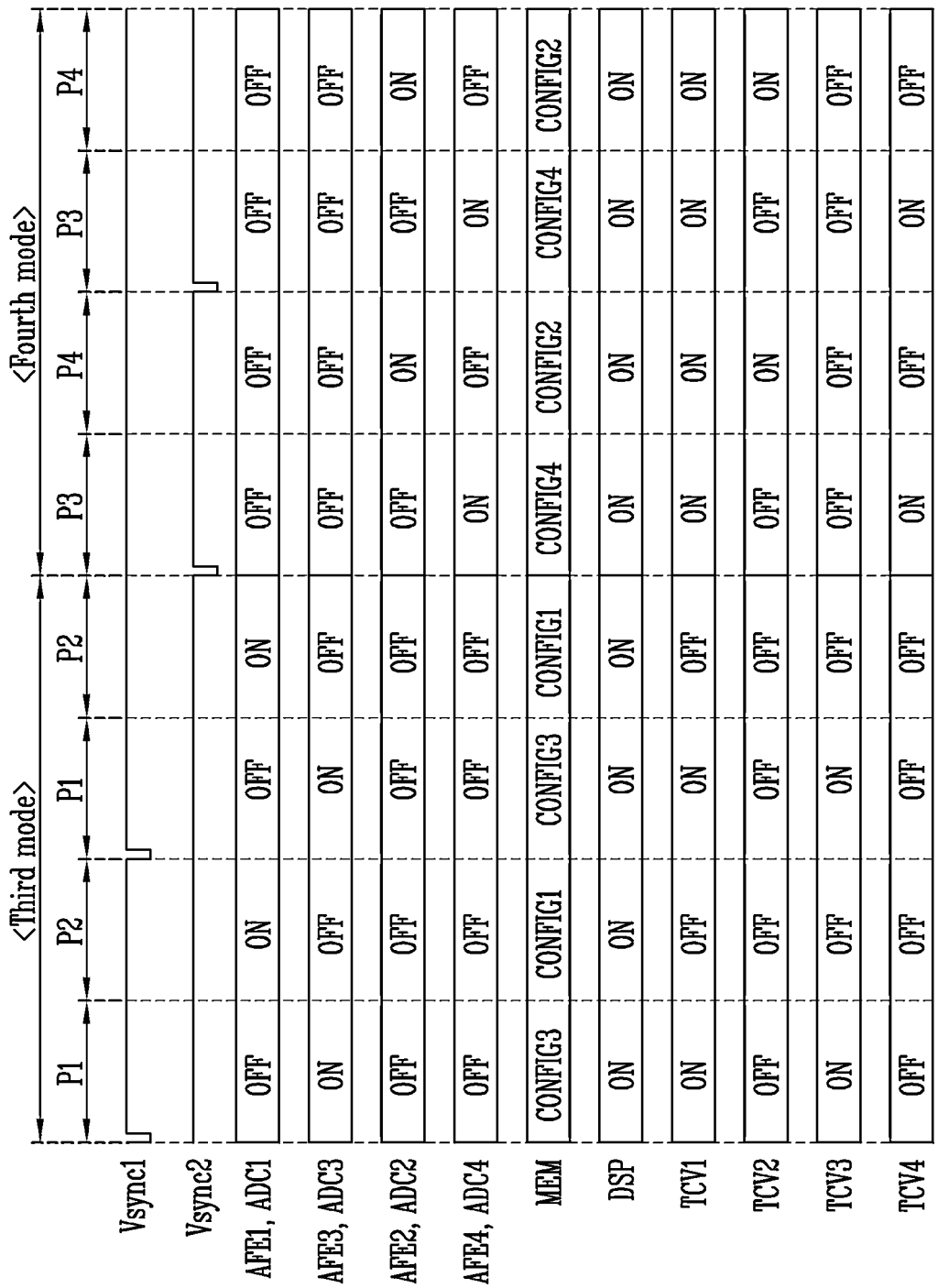
FIG. 14 is a diagram illustrating operations in a fourth mode according to an embodiment of the disclosure.

FIG. 14 is a diagram illustrating operations in a fourth mode according to an embodiment of the disclosure.

In the fourth mode, the second display panel DP2 may display the image frame, and the first display panel DP1 may stop display of the image frame. Referring to FIG. 14, it may be seen that a second vertical synchronization signal Vysnc2 including pulses is transmitted and the first vertical synchronization signal Vsync1 maintains a specific voltage level during the fourth mode. The fourth sensor driver 320b may confirm that a mode is the fourth mode by receiving the second vertical synchronization signal Vsync2.

A frame period in which the second display panel DP2 displays one image frame may include a third period P3 and a fourth period P4. During the third period P3, the second switch unit SWC2 may connect the second sensor unit 120b to the fourth sensor driver 320b. During the fourth period P4, the second switch unit SWC2 may connect the second sensor unit 120b to the second sensor driver 220b. In FIG. 14, the third period P3 is positioned before the fourth period P4, but in another embodiment, the fourth period P4 may be positioned before the third period P3.

During the third period P3, the second analog front end AFE2 and the second analog-to-digital converter ADC2 may not operate, and the fourth analog front end AFE4 and the fourth analog-to-digital converter ADC4 may generate fourth sensing information for the second sensor unit 120b. The digital signal processor DSP may process the fourth sensing information based on a fourth setting value CONFIG. 4 for the second sensor unit 120b stored in the memory MEM. Since the second setting value CONFIG. 2 for the second sensor unit 120b is for the first object OBJ1 and the fourth setting value CONFIG. 4 for the second sensor unit 120b is for the second object OBJ2, the second setting value CONFIG. 2 and the fourth setting value CONFIG. 4 may be different from each other. For example, the number of sensing nodes used for detecting the second object OBJ2 may be greater than the number of sensing nodes used for detecting the first object OBJ1. The output value of the digital signal processor DSP may include the position, pressure, and inclination of the second object OBJ2 for the second sensor unit 120b, the instruction using the second object OBJ2 by the user, and the like.

During the fourth period P4, the second analog front end AFE2 and the second analog-to-digital converter ADC2 may generate second sensing information for the second sensor unit 120b, and the fourth analog front end AFE4 and the fourth analog-to-digital converter ADC4 may not operate. The digital signal processor DSP may process the second sensing information based on the second setting value CONFIG. 2 for the second sensor unit 120b stored in the memory MEM. The output value of the digital signal processor DSP may include the position, pressure, proximity degree, and the like of the first object OBJ1 for the second sensor unit 120b.

During the third period P3, the fourth sensing information may be transmitted to the digital signal processor DSP through the fourth transceiver TCV4 and the first transceiver TCV1.

Figure 15:
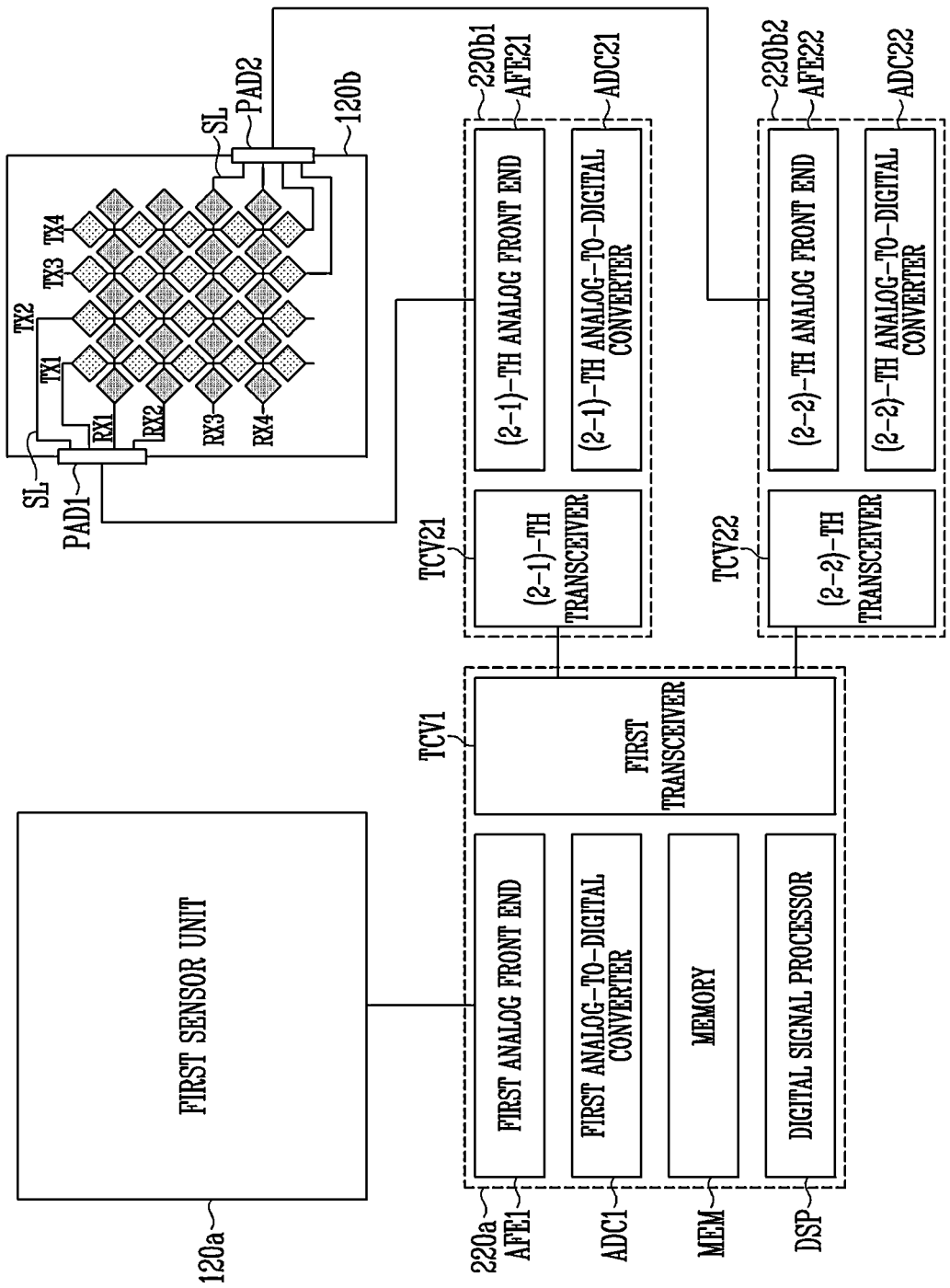
FIG. 15 is a diagram illustrating a (2-1)-th sensor driver and a (2-2)-th sensor driver according to an embodiment of the disclosure.

FIG. 15 is a diagram illustrating a (2-1)-th sensor driver and a (2-2)-th sensor driver according to an embodiment of the disclosure.

When describing FIG. 15, a description of a portion overlapping FIG. 5 is omitted. Referring to FIG. 15, it may be seen that the second sensor driver 220b of FIG. 5 is divided into the (2-1)-th sensor driver 220b1 and the (2-2)-th sensor driver 220b2.

The (2-1)-th sensor driver 220b1 may include a (2-1)-th analog front end AFE21, a (2-1)-th analog-to-digital converter ADC21, and a (2-1)-th transceiver TCV21. The (2-1)-th analog front end AFE21 may be connected to some TX1 and TX2 of the first sensors TX and some RX1 and RX2 of the second sensors RX of the second sensor unit 120b.

The (2-2)-th sensor driver 220b2 may include a (2-2)-th analog front end AFE22, a (2-2)-th analog-to-digital converter ADC22, and a (2-2)-th transceiver TCV22. The (2-2)-th analog front end AFE22 may be connected to some TX3 and TX4 of the first sensors TX and some RX3 and RX4 of the second sensors RX of the second sensor unit 120b.

A portion of the first sensors TX and the second sensors RX may be connected to a first pad unit PAD1 through lines SL, and the first pad unit PAD1 may be connected to the (2-1)-th analog front end AFE21. In addition, a portion of the first sensors TX and the second sensors RX may be connected to a second pad unit PAD2 through lines SL, and the second pad unit PAD2 may be connected to the (2-2)-th analog front end AFE22.

According to the present embodiment, the pad units PAD1 and PAD2 may be distributed, and thus an undesirable parasitic capacitance between the lines SL may be minimized. In addition, according to the present embodiment, since a length of the lines SL may be adjusted in a balanced manner, thereby minimizing an RC delay difference.

Figure 16:
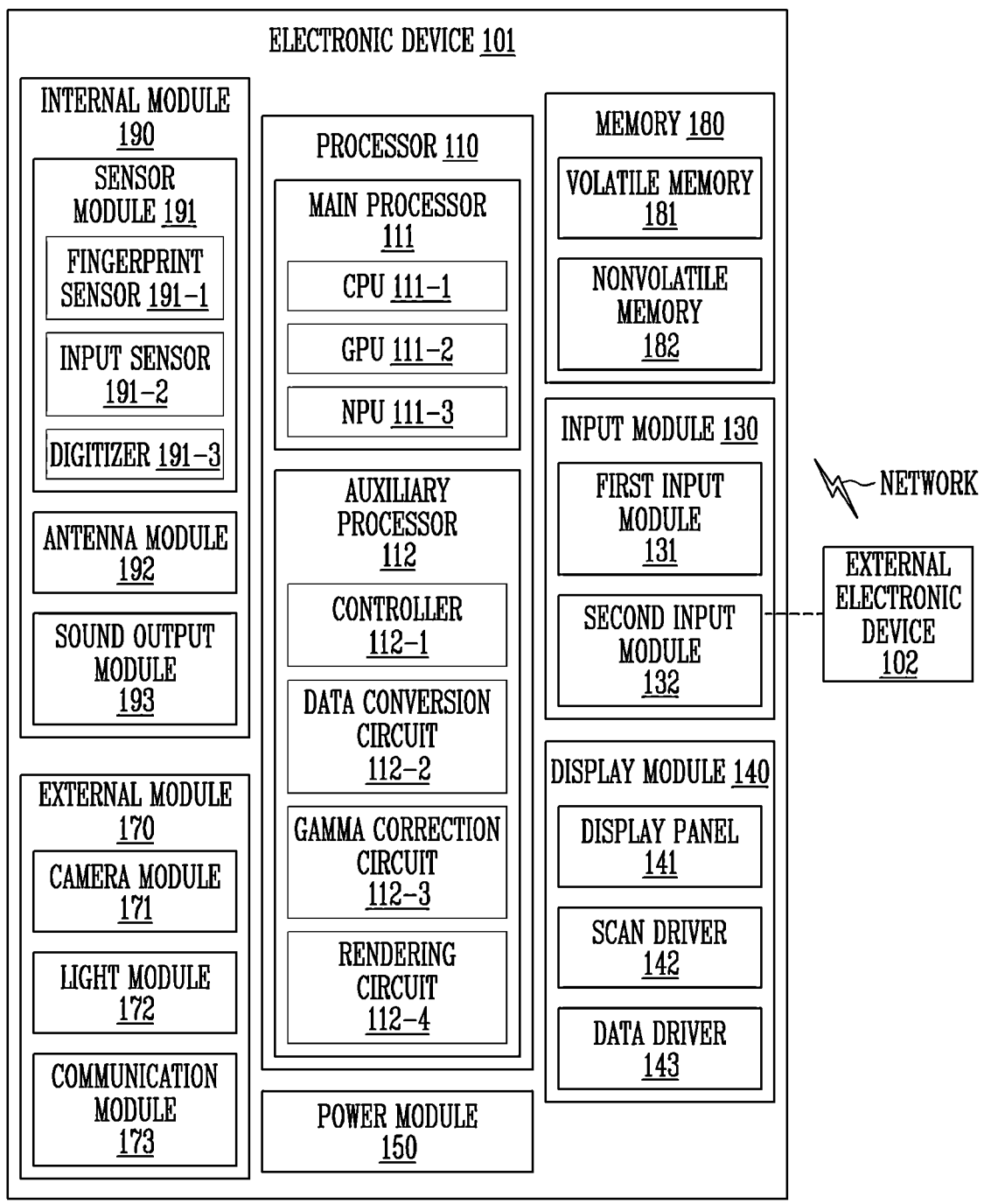
FIG. 16 is a diagram illustrating an electronic device according to an embodiment of the disclosure.

FIG. 16 is a diagram illustrating an electronic device according to an embodiment of the disclosure.

The electronic device 101 outputs various pieces of information through a display module 140 in an operating system. When a processor 110 executes an application stored in a memory 180, the display module 140 provides application information to a user through a display panel 141.

The processor 110 obtains an external input through an input module 130 or a sensor module 191 and executes an application corresponding to the external input. For example, when the user selects a camera icon displayed on the display panel 141, the processor 110 obtains a user input through an input sensor 191-2 and activates a camera module 171. The processor 110 transmits image data corresponding to a captured image obtained through the camera module 171 to the display module 140. The display module 140 may display an image corresponding to the captured image through the display panel 141.

As another example, when personal information authentication is executed in the display module 140, a fingerprint sensor 191-1 obtains input fingerprint information as input data. The processor 110 compares input data obtained through the fingerprint sensor 191-1 with authentication data stored in the memory 180 and executes an application according to a comparison result. The display module 140 may display information executed according to a logic of the application through the display panel 141.

As still another example, when a music streaming icon displayed on the display module 140 is selected, the processor 110 obtains a user input through the input sensor 191-2 and activates a music streaming application stored in the memory 180. When a music execution command is input in the music streaming application, the processor 110 activates a sound output module 193 to provide sound information corresponding to the music execution command to the user.

In the above, an operation of the electronic device 101 is briefly described. Hereinafter, a configuration of the electronic device 101 is described in detail. Some of configurations of the electronic device 101 to be described later may be integrated and provided as one configuration, and one configuration may be separated into two or more configurations and provided.

Referring to FIG. 16, the electronic device 101 may communicate with an external electronic device 102 through a network (for example, a short-range wireless communication network or a long-range wireless communication network). According to an embodiment, the electronic device 101 may include the processor 110, the memory 180, the input module 130, the display module 140, a power module 150, an internal module 190, and an external module 170. According to an embodiment, in the electronic device 101, at least one of the above-described components may be omitted or one or more other components may be added. According to an embodiment, some of the above-described components (for example, the sensor module 191, an antenna module 192, or the sound output module 193) may be integrated into another component (for example, the display module 140).

The processor 110 may execute software to control at least another component (for example, a hardware or software component) of the electronic device 101 connected to the processor 110, and perform various data processing or operations. According to an embodiment, as at least a portion of the data processing or operation, the processor 110 may store a command or data received from another component (for example, the input module 130, the sensor module 191, or a communication module 173) in a volatile memory 181 and process the command or the data stored in the volatile memory 181, and result data may be stored in a nonvolatile memory 182.

The processor 110 may include the main processor 111 and an auxiliary processor 112. The main processor 111 may include one or more of a central processing unit (CPU) 111-1 or an application processor (AP). The main processor 111 may further include any one or more of a graphic processing unit (GPU) 111-2, a communication processor (CP), and an image signal processor (ISP). The main processor 111 may further include a neural processing unit (NPU) 111-3. The NPU is a processor specialized in processing an artificial intelligence model, and the artificial intelligence model may be generated through machine learning. The artificial intelligence model may include a plurality of artificial neural network layers. The artificial neural network may be one of a deep neural network ("DNN"), a convolutional neural network ("CNN"), a recurrent neural network ("RNN"), a restricted boltzmann machine ("RBM"), a deep belief network ("DBN"), a bidirectional recurrent deep neural network ("BRDNN"), a deep Q-network, or a combination of two or more of the above, but is not limited to the above-described example. Additionally or alternatively, the artificial intelligence model may include a software structure in addition to a hardware structure. At least two of the above-described processing units and processors may be implemented as one integrated configuration (for example, a single chip), or each may be implemented as an independent configuration (for example, a plurality of chips).

The auxiliary processor 112 may include a controller 112-1. The controller 112-1 may include an interface conversion circuit and a timing control circuit. The controller 112-1 receives an image signal from the main processor 111, converts a data format of the image signal to correspond to an interface specification with the display module 140, and outputs image data. The controller 112-1 may output various control signals necessary for driving the display module 140.

The auxiliary processor 112 may further include a data conversion circuit 112-2, a gamma correction circuit 112-3, a rendering circuit 112-4, and the like. The data conversion circuit 112-2 may receive the image data from the controller 112-1, compensate the image data to display an image with a desired luminance according to a characteristic of the electronic device 101, a setting of the user, or the like, or convert the image data for reduction of power consumption, afterimage compensation, or the like. The gamma correction circuit 112-3 may convert the image data, a gamma reference voltage, or the like so that the image displayed on the electronic device 101 has a desired gamma characteristic. The rendering circuit 112-4 may receive the image data from the controller 112-1 and render the image data in consideration of a pixel disposition or the like of the display panel 141 applied to the electronic device 101. At least one of the data conversion circuit 112-2, the gamma correction circuit 112-3, and the rendering circuit 112-4 may be integrated into another component (for example, the main processor 111 or the controller 112-1). At least one of the data conversion circuit 112-2, the gamma correction circuit 112-3, and the rendering circuit 112-4 may be integrated into a data driver 143 to be described later.

The memory 180 may store various data used by at least one component (for example, the processor 110 or the sensor module 191) of the electronic device 101, and input data or output data for a command related thereto. The memory 180 may include at least one of the volatile memory 181 and the nonvolatile memory 182. The memory MEM of FIG. 5 may correspond to the memory 180 of the electronic device 101.

The input module 130 may receive a command or data to be used by a component (for example, the processor 110, the sensor module 191, or the sound output module 193) of the electronic device 101 from an outside (for example, the user or the external electronic device 102) of the electronic device 101.

The input module 130 may include a first input module 131 to which a command or data is input from the user and a second input module 132 to which a command or data is input from the external electronic device 102. The first input module 131 may include a microphone, a mouse, a keyboard, a key (for example, a button), or a pen (for example, a passive pen or an active pen). The second object OBJ2 of FIG. 7 may correspond to the first input module 131.

The second input module 132 may support a designated protocol capable of connecting to the external electronic device 102 by wire or wirelessly. According to an embodiment, the second input module 132 may include a high definition multimedia interface ("HDMI"), a universal serial bus ("USB") interface, an SD card interface, or an audio interface. The second input module 132 may include a connector capable of physically connecting to the external electronic device 102, for example, an HDMI connector, a USB connector, an SD card connector, or an audio connector (for example, a headphone connector).

The display module 140 visually provides information to the user. The display module 140 may include the display panel 141, a scan driver 142, and the data driver 143. The display module 140 may further include a window, a chassis, and a bracket for protecting the display panel 141.

The display panel 141 may include a liquid crystal display panel, an organic light emitting display panel, or an inorganic light emitting display panel, and a type of the display panel 141 is not particularly limited. The display panel 141 may be a rigid type or a flexible type that may be rolled or folded. The display module 140 may further include a supporter, a bracket, a heat dissipation member, or the like that supports the display panel 141. Each of the first display panel DP1 of FIG. 1 and the second display panel DP2 of FIG. 2 may correspond to the display panel 141.

The scan driver 142 may be mounted on the display panel 141 as a driving chip. In addition, the scan driver 142 may be integrated in the display panel 141. For example, the scan driver 142 may include an amorphous silicon TFT gate driver circuit ("ASG"), a low temperature polycrystalline silicon ("LTPS") TFT gate driver circuit, or an oxide semiconductor TFT gate driver circuit ("OSG") built in the display panel 141. The scan driver 142 receives a control signal from the controller 112-1 and outputs the scan signals to the display panel 141 in response to the control signal.

The display panel 141 may further include an emission driver. The emission driver outputs an emission control signal to the display panel 141 in response to the control signal received from the controller 112-1. The emission driver may be formed separately from the scan driver 142 or integrated into the scan driver 142.

The data driver 143 receives the control signal from the controller 112-1, converts image data into an analog voltage (for example, a data voltage) in response to the control signal, and then outputs the data voltages to the display panel 141.

The data driver 143 may be integrated into another component (for example, the controller 112-1). A function of the interface conversion circuit and the timing control circuit of the controller 112-1 described above may be integrated into the data driver 143. The first display driver 210*a* of FIG. 3 and the second display driver 210*b* of FIG. 4 may correspond to at least a portion of the data driver 143, the timing control circuit, the emission driver, and the scan driver 142.

The display module 140 may further include the emission driver, a voltage generation circuit, and the like. The voltage generation circuit may output various voltages necessary for driving the display panel 141.

The power module 150 supplies power to a component of the electronic device 101. The power module 150 may include a battery that charges a power voltage. The battery may include a non-rechargeable primary cell, and a rechargeable secondary cell or fuel cell. The power module 150 may include a power management integrated circuit ("PMIC"). The PMIC supplies optimized power to each of the above-described module and a module to be described later. The power module 150 may include a wireless power transmission/reception member electrically connected to the battery. The wireless power transmission/reception member may include a plurality of antenna radiators of a coil form.

The electronic device 101 may further include the internal module 190 and the external module 170. The internal module 190 may include the sensor module 191, the antenna module 192, and the sound output module 193. The external module 170 may include the camera module 171, a light module 172, and the communication module 173.

The sensor module 191 may sense an input by a body of the user or an input by a pen among the first input module 131, and may generate an electrical signal or a data value corresponding to the input. The sensor module 191 may include at least one of the fingerprint sensor 191-1, the input sensor 191-2, and a digitizer 191-3. The first sensor unit 120*a* and the first sensor driver 220*a* of FIG. 3 and the second sensor unit 121*b* and the second sensor driver 220*b* of FIG. 4 may correspond to the sensor module 191. According to an embodiment, the third sensor driver 320*a* and the fourth sensor driver 320*b* of FIG. 13 may also correspond to the sensor module 191.

The fingerprint sensor 191-1 may generate a data value corresponding to a fingerprint of the user. The fingerprint sensor 191-1 may include any one of an optical type fingerprint sensor or a capacitive type fingerprint sensor.

The input sensor 191-2 may generate a data value corresponding to coordinate information of the input by the body of the user or the pen. The input sensor 191-2 generates a capacitance change amount by the input as the data value. The input sensor 191-2 may sense an input by the passive pen or may transmit/receive data to and from the active pen.

The input sensor 191-2 may measure a biometric signal such as blood pressure, water, or body fat. For example, when the user touches a sensor layer or a sensing panel with a body part and does not move during a certain time, the input sensor 191-2 may sense the biometric signal based on a change of an electric field by the body part and output information desired by the user to the display module 140.

The digitizer 191-3 may generate a data value corresponding to coordinate information input by a pen. The digitizer 191-3 generates an electromagnetic change amount by an input as the data value. The digitizer 191-3 may sense an input by a passive pen or transmit or receive data to or from the active pen.

At least one of the fingerprint sensor 191-1, the input sensor 191-2, and the digitizer 191-3 may be implemented as a sensor layer formed on the display panel 141 through a successive process. The fingerprint sensor 191-1, the input sensor 191-2, and the digitizer 191-3 may be disposed on the display panel 141, and any one of the fingerprint sensor 191-1, the input sensor 191-3, and the digitizer 191-3, for example, the digitizer 191-3 may be disposed under the display panel 141.

At least two of the fingerprint sensor 191-1, the input sensor 191-2, and the digitizer 191-3 may be formed to be integrated into one sensing panel through the same process. When at least two of the fingerprint sensor 191-1, the photo sensor 1161-2, and the input sensor 191-2 are integrated into one sensing panel, the sensing panel may be disposed between the display panel 141 and a window disposed above the display panel 141. According to an embodiment, the sensing panel may be disposed on the window, and a position of the sensing panel is not particularly limited.

At least one of the fingerprint sensor 191-1, the input sensor 191-2, and the digitizer 191-3 may be embedded in the display panel 141. That is, at least one of the fingerprint sensor 191-1, the input sensor 191-2, and the digitizer 191-3 may be simultaneously formed through a process of forming elements (for example, a light emitting element, a transistor, and the like) included in the display panel 141.

In addition, the sensor module 191 may generate an electrical signal or a data value corresponding to an internal state or an external state of the electronic device 101. The sensor module 191 may further include, for example, a gesture sensor, a gyro sensor, a barometric pressure sensor, a magnetic sensor, an acceleration sensor, a grip sensor, a proximity sensor, a color sensor, an infrared ("IR") sensor, a biometric sensor, a temperature sensor, a humidity sensor, or an illuminance sensor.

The antenna module 192 may include one or more antennas for transmitting a signal or power to an outside or receiving a signal or power from an outside. According to an embodiment, the communication module 173 may transmit a signal to an external electronic device or receive a signal from an external electronic device through an antenna suitable for a communication method. An antenna pattern of the antenna module 192 may be integrated into one configuration (for example, the display panel 141) of the display module 140 or the input sensor 191-2.

The sound output module 193 is a device for outputting a sound signal to an outside of the electronic device 101, and may include, for example, a speaker used for general purposes such as multimedia playback or recording playback, and a receiver used exclusively for receiving a call. According to an embodiment, the receiver may be formed integrally with or separately from the speaker. A sound output pattern of the sound output module 193 may be integrated into the display module 140.

The camera module 171 may capture a still image and a moving image. According to an embodiment, the camera module 171 may include one or more lenses, an image sensor, or an image signal processor. The camera module 171 may further include an infrared camera capable of measuring presence or absence of the user, a position of the user, a gaze of the user, and the like.

The light module 172 may provide light. The light module 172 may include a light emitting diode or a xenon lamp. The light module 172 may operate in conjunction with the camera module 171 or may operate independently.

The communication module 173 may support establishment of a wired or wireless communication channel between the electronic device 101 and the external electronic device 102 and communication performance through the established communication channel. The communication module 173 may include any one or both of a wireless communication module such as a cellular communication module, a short-range wireless communication module, or a global navigation satellite system ("GNSS") communication module, and a wired communication module such as a local area network ("LAN") communication module or a power line communication module. The communication module 173 may communicate with the external electronic device 102 through a short-range communication network such as Bluetooth, WiFi direct, or infrared data association ("IrDA"), or a long-range communication network such as a cellular network, the Internet, or a computer network (for example, LAN or WAN). The above-described various types of communication modules 1173 may be implemented as a single chip or as separate chips.

The input module 130, the sensor module 191, the camera module 171, and the like may be used to control an operation of the display module 140 in conjunction with the processor 110.

The processor 110 outputs a command or data to the display module 140, the sound output module 193, the camera module 171, or the light module 172 based on input data received from the input module 130. For example, the processor 110 may generate image data in response to the input data applied through a mouse, an active pen, or the like and output the image data to the display module 140, or generate command data in response to the input data and output the command data to the camera module 171 or the light module 172. When the input data is not received from the input module 130 during a certain time, the processor 110 may convert an operation mode of the electronic device 101 to a low power mode or a sleep mode to reduce power consumed in the electronic device 101.

The processor 110 outputs a command or data to the display module 140, the sound output module 193, the camera module 171, or the light module 172 based on sensing data received from the sensor module 191. For example, the processor 110 may compare authentication data applied by the fingerprint sensor 191-1 with authentication data stored in the memory 180 and then execute an application according to a comparison result. The processor 110 may execute the command based on sensing data sensed by the input sensor 191-2 or the digitizer 191-3, or output corresponding image data to the display module 140. When the sensor module 191 includes a temperature sensor, the processor 110 may receive temperature data for a measured temperature from the sensor module 191 and further perform luminance correction or the like on the image data based on the temperature data.

The processor 110 may receive measurement data for the presence of the user, the position of the user, the gaze of the user, and the like, from the camera module 171. The processor 110 may further perform luminance correction or the like on the image data based on the measurement data. For example, the processor 110 determining the presence or absence of the user through an input from the camera module 171 may output image data of which a luminance is corrected through the data conversion circuit 112-2 or the gamma correction circuit 112-3 to the display module 140.

Some of the above-described components may be connected to each other through a communication method between peripheral devices, for example, a bus, general purpose input/output ("GPIO"), a serial peripheral interface ("SPI"), a mobile industry processor interface ("MIPI"), or an ultra path interconnect ("UPI") link to exchange a signal (for example, a command or data) with each other. The processor 110 may communicate with the display module 140 through a mutually agreed interface, for example, may use any one of the above-described communication methods, and is not limited to the above-described communication method.

The electronic device 101 according to various embodiments disclosed in this document may be various types of devices. The electronic device 101 may include, for example, at least one of a portable communication device (for example, a smart phone), a computer device, a portable multimedia device, a portable medical device, a camera, a wearable device, or a home appliance. The electronic device 101 according to an embodiment of this document is not limited to the above-described devices.

The drawings referred to so far and the detailed description of the disclosure described herein are merely examples of the disclosure, are used for merely describing the disclosure, and are not intended to limit the meaning and the scope of the disclosure described in claims. Therefore, those skilled in the art will understand that various modifications and equivalent other embodiments are possible from these. Thus, the true scope of the disclosure should be determined by the technical spirit of the appended claims.

What is claimed is:

1. A display device comprising:
   a first display panel including a first sensor unit;
   a second display panel including a second sensor unit;
   a first sensor driver connected to the first sensor unit; and a second sensor driver connected to the second sensor unit, wherein the first sensor driver includes a first analog front end, a first analog-to-digital converter, a memory, a digital signal processor, and a first transceiver, the second sensor driver includes a second analog front end, a second analog-to-digital converter, and a second transceiver, in a first mode, the first analog front end and the first analog-to-digital converter generate first sensing information for the first sensor unit, the second analog front end and the second analog-to-digital converter do not operate, and the digital signal processor processes the first sensing information based on a first setting value for the first sensor unit stored in the memory, and in a second mode, the first analog front end and the first analog-to-digital converter do not operate, the second analog front end and the second analog-to-digital converter generate second sensing information for the second sensor unit, and the digital signal processor processes the second sensing information based on a second setting value for the second sensor unit stored in the memory.

2. The display device according to claim 1, wherein in the first mode, the first display panel displays an image frame, and the second display panel does not display an image frame, and in the second mode, the first display panel does not display an image frame, and the second display panel displays an image frame.

3. The display device according to claim 2, wherein in the second mode, the second sensing information is transmitted to the digital signal processor through the second transceiver and the first transceiver, and the digital signal processor processes the second sensing information during a period in which the first display panel does not display the image frame.

4. The display device according to claim 1, wherein the digital signal processor is a multi-core processor including a plurality of cores, and a total number of cores, among the plurality of cores, used by the digital signal processor in the second mode is less than a total number of cores, among the plurality of cores, used by the digital signal processor in the first mode.

5. The display device according to claim 1, further comprising:

a third sensor driver configured to be connected to the first sensor unit; and a first switch unit electrically connecting the first sensor unit to one of the first sensor driver and the third sensor driver, wherein the third sensor driver includes a third analog front end, a third analog-to-digital converter, and a third transceiver.

6. The display device according to claim 5, wherein in a third mode, the first display panel displays an image frame, and the second display panel does not display an image frame, a frame period in which the first display panel displays one image frame includes a first period and a second period, during the first period, the first switch unit connects the first sensor unit to the third sensor driver, and during the second period, the first switch unit connects the first sensor unit to the first sensor driver.

7. The display device according to claim 6, wherein during the first period, the first analog front end and the first analog-to-digital converter do not operate, the third analog front end and the third analog-to-digital converter generate third sensing information for the first sensor unit, and the digital signal processor processes the third sensing information based on a third setting value for the first sensor unit stored in the memory, and during the second period, the first analog front end and the first analog-to-digital converter generate the first sensing information for the first sensor unit, the third analog front end and the third analog-to-digital converter do not operate, and the digital signal processor processes the first sensing information based on the first setting value for the first sensor unit stored in the memory.

8. The display device according to claim 6, wherein the first sensor unit includes first sensors and second sensors forming a capacitance with the first sensors, during the first period, the third analog front end applies uplink signals to the first sensors and the second sensors and receives a downlink signal through the first sensors and the second sensors, and during the second period, the first analog front end applies driving signals to the first sensors and receives sensing signals through the second sensors.

9. The display device according to claim 8, wherein the first analog front end comprises:

a first driving signal generator for generating the driving signals; and first channels connected to the second sensors, and wherein the first driving signal generator is connected to the first sensors.

10. The display device according to claim 9, wherein the third analog front end comprises:

a second driving signal generator for generating the uplink signals;

second channels; and a switch circuit electrically connecting the first sensors and the second sensors to the second driving signal generator or the second channels.

11. The display device according to claim 1, further comprising:

a fourth sensor driver configured to be connected to the second sensor unit; and a second switch unit electrically connecting the second sensor unit to one of the second sensor driver and the fourth sensor driver, wherein the fourth sensor driver includes a fourth analog front end, a fourth analog-to-digital converter, and a fourth transceiver.

12. The display device according to claim 11, wherein in a fourth mode, the first display panel does not display an image frame, and the second display panel displays an image frame, a frame period in which the second display panel displays one image frame includes a third period and a fourth period, during the third period, the second switch unit connects the second sensor unit to the fourth sensor driver, and during the fourth period, the second switch unit connects the second sensor unit to the second sensor driver.

13. The display device according to claim 12, wherein during the third period, the second analog front end and the second analog-to-digital converter do not operate, the fourth analog front end and the fourth analog-to-digital converter generate fourth sensing information for the second sensor unit, and the digital signal processor processes the fourth sensing information based on a fourth setting value for the second sensor unit stored in the memory, and during the fourth period, the second analog front end and the second analog-to-digital converter generate the second sensing information for the second sensor unit, the fourth analog front end and the fourth analog-to-digital converter do not operate, and the digital signal processor processes the second sensing information based on the second setting value for the second sensor unit stored in the memory.

14. A display device comprising:

a first display panel including a first sensor unit;

a second display panel including a second sensor unit;

a first sensor driver connected to the first sensor unit;

a (2-1)-th sensor driver connected to a portion of the second sensor units; and a (2-2)-th sensor driver connected to another portion of the second sensor unit, wherein the first sensor driver includes a first analog front end, a first analog-to-digital converter, a memory, a digital signal processor, and a first transceiver, the (2-1)-th sensor driver includes a (2-1)-th analog front end, a (2-1)-th analog-to-digital converter, and a (2-1)-th transceiver, the (2-2)-th sensor driver includes a (2-2)-th analog front end, a (2-2)-th analog-to-digital converter, and a (2-2)-th transceiver, in a first mode, the first analog front end and the first analog-to-digital converter generate first sensing information for the first sensor unit, the (2-1)-th analog front end, the (2-1)-th analog-to-digital converter, the (2-2)-th analog front end, and the (2-2)-th analog-to-digital converter do not operate, and the digital signal processor processes the first sensing information based on a first setting value for the first sensor unit stored in the memory, and in a second mode, the first analog front end and the first analog-to-digital converter do not operate, the (2-1)-th analog front end, the (2-1)-th analog-to-digital converter, the (2-2)-th analog front end, and the (2-2)-th analog-to-digital converter generates second sensing information for the second sensor unit, and the digital signal processor processes the second sensing information based on a second setting value for the second sensor unit stored in the memory.

\* \* \* \* \*